(12) United States Patent
Min et al.

(10) Patent No.: US 12,523,309 B2
(45) Date of Patent: Jan. 13, 2026

(54) FLOW PATH SWITCHING DEVICE

(71) Applicant: LG Electronics Inc., Seoul (KR)

(72) Inventors: Junho Min, Seoul (KR); Sungbae Song, Seoul (KR); Moonkee Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 18/284,841

(22) PCT Filed: Mar. 25, 2022

(86) PCT No.: PCT/KR2022/004196
§ 371 (c)(1),
(2) Date: Sep. 28, 2023

(87) PCT Pub. No.: WO2022/211381
PCT Pub. Date: Oct. 6, 2022

(65) Prior Publication Data
US 2024/0175502 A1  May 30, 2024

(30) Foreign Application Priority Data

Mar. 29, 2021 (KR) .................. 10-2021-0040282

(51) Int. Cl.
*F16K 11/085* (2006.01)
*F16K 27/00* (2006.01)
(Continued)

(52) U.S. Cl.
CPC ........ *F16K 11/0856* (2013.01); *F16K 11/085* (2013.01); *F16K 27/003* (2013.01);
(Continued)

(58) Field of Classification Search
CPC .. F16K 11/0856; F16K 11/085; F16K 27/003; F16K 27/065; F16K 31/041; F25B 41/20
See application file for complete search history.

(56) References Cited

U.S. PATENT DOCUMENTS 3,090,396 A * 5/1963 Rudelick ............. F16K 11/0856
251/324
4,445,540 A * 5/1984 Baron ...................... F16L 45/00
137/625.43
(Continued)

FOREIGN PATENT DOCUMENTS

CN       1532439         9/2004
GB       104594 A  *    3/1917
(Continued)

OTHER PUBLICATIONS

Extended European Search Report in European Appln. No. 22781500.8, mailed on Feb. 19, 2025, 9 pages.

*Primary Examiner* — Jessica Cahill
(74) *Attorney, Agent, or Firm* — Fish & Richardson P.C.

(57) ABSTRACT

Disclosed is a flow path switching device including: a case including a first nozzle into which fluid is introduced, a second nozzle through which fluid is discharged, a plurality of inner outflow pipes through which fluid supplied from the first nozzle flows, a plurality of inner inflow pipes through which the fluid supplied to the second nozzle flows, and a flow path connection portion in which a space is formed to communicate the plurality of inner outflow pipes with the first nozzle or to communicate the plurality of inner inflow pipes with the second nozzle; a valve rotatably disposed in the space of the flow path connection portion, and having a first chamber connecting one of the plurality of inner inflow pipes and the first nozzle according to placement, and a second chamber connecting one of the plurality of inner outflow pipes and the second nozzle; and a motor disposed in one side of the valve and rotating the valve. Each of the first nozzle, the inner outflow pipe, and the flow path connection portion forms a flow path perpendicular to each other inside. A first chamber hole connecting the first chamber and a nozzle flow path formed inside the first nozzle is (Continued)

formed in the valve. A cross-sectional area of the nozzle flow path is reduced to a size corresponding to the first chamber hole from an inlet portion of the first nozzle towards the flow connection portion.

19 Claims, 25 Drawing Sheets

(51) Int. Cl.
- *F16K 27/06* (2006.01)
- *F16K 31/04* (2006.01)
- *F25B 41/20* (2021.01)
- *F16K 11/22* (2006.01)
- *F25B 13/00* (2006.01)

(52) U.S. Cl.
CPC .......... *F16K 27/065* (2013.01); *F16K 31/041* (2013.01); *F25B 41/20* (2021.01); *F16K 11/22* (2013.01); *F25B 13/00* (2013.01); *F25B 2313/003* (2013.01); *F25B 2313/007* (2013.01)

(56) References Cited

U.S. PATENT DOCUMENTS

| | | | |
|---|---|---|---|
| 8,905,076 B2* | 12/2014 | Jorgensen | F16K 11/0856 237/12.3 B |
| 2006/0156752 A1* | 7/2006 | Park | F24F 13/222 62/324.5 |
| 2009/0211283 A1* | 8/2009 | Koh | F25B 13/00 62/275 |
| 2017/0191574 A1* | 7/2017 | Takamatsu | F16K 11/076 |
| 2022/0090691 A1* | 3/2022 | Rosa Brusin | F16K 11/0873 |

FOREIGN PATENT DOCUMENTS

| | | | | |
|---|---|---|---|---|
| GB | 272745 A * | 6/1927 | | |
| JP | H07-260019 | 10/1995 | | |
| JP | 2017-172773 | 9/2017 | | |
| JP | 6192706 B2 | 9/2017 | | |
| KR | 10-1987469 | 6/2019 | | |
| WO | WO-2004081430 A1 * | 9/2004 | .......... | F16K 11/0856 |
| WO | 2019206510 A1 | 10/2019 | | |
| WO | 2020157612 A1 | 8/2020 | | |

* cited by examiner

FLOW PATH SWITCHING DEVICE

CROSS-REFERENCE TO RELATED APPLICATIONS

This application is a National Stage application under 35 U.S.C. § 371 of International Application No. PCT/KR2022/004196, filed on Mar. 25, 2022, which claims the benefit of Korean Patent Application No. 10-2021-0040282, filed on Mar. 29, 2021. The disclosures of the prior applications are incorporated by reference in their entirety.

BACKGROUND

Field

The present disclosure relates to an air conditioner, and more particularly, to an air conditioner including a flow path switching device.

Related Art

Air conditioners are apparatuses that maintain air in a predetermined space to the most proper state according to use and purpose thereof. Such an air conditioner includes a compressor, a condenser, an expansion device, and evaporator. Thus, the air conditioner has a refrigerant cycle in which compression, condensation, expansion, and evaporation processes of a refrigerant are performed to cool or heat a predetermined space.

Recently, types of a refrigerant used in the air conditioner and a charge amount of refrigerant may be limited according to environmental regulations. In addition, in order to ensure safety against leakage of the refrigerant, it may be required for a refrigerant line circulating in the air conditioner to be limitedly installed in an indoor space.

Therefore, to reduce an amount of refrigerant used in the air conditioner and remove refrigerant lines in indoor spaces, a technology for introducing water-based lines to regulate the temperature within indoor spaces is being proposed.

A related document JP 5236009 discloses an air conditioner capable of adjusting temperature of an indoor space by exchanging heat between a refrigerant and water and supplying the heat-exchanged water to a plurality of indoor units.

Here, a valve may be provided to send water heat-exchanged with the refrigerant to each of the plurality of indoor units.

JP 6192706 discloses a flow path switching device for individually supplying water, which has been cooled or heated through two heat exchangers, to each of the plurality of indoor units.

However, for the flow path switching device disclosed in the above document, a water pipe connected to a heat exchanger is formed in a vertical direction based on the valve for switching the flow path. Therefore, to install the plurality of valves to connect with the plurality of indoor units, there is a spatial constraint where the valves must be arranged solely in an extending direction.

Within a valve, a nozzle through which water supplied from an indoor unit enters, and a water pipe through which water flows to a heat exchanger are positioned at a distance from each other, and this arrangement increases a space for water movement, leading to issues such as an increased water quantity required in the water pipe and the occurrence of flow resistance due to water abruptly changing direction in the flow path.

In addition, for the related document, there is a problem that water flowing inside a case may leak between the valve and the space where the valve rotates inside the case.

SUMMARY

An objective of the present disclosure is to provide a flow path switching device capable of various changes in shapes, thereby modifying and adjusting an appearance thereof according to a size or shape of an accommodating space.

Another object of the present disclosure is to minimize an amount of fluid flowing through a water pipe by minimizing a space in which the fluid flows in a valve. That is, it aims to minimize an area where fluid flows outside a heat exchanger, thereby preventing heat loss or dissipation during movement of the fluid. In addition, it is to provide a flow path switching device that minimizes flow loss occurring in the process of changing the flow path in various directions inside the valve.

Yet another object of the present disclosure is to provide a flow path switching device that minimizes a water leakage into a space between a space, where the valve rotates, and the valve within the case.

Objectives of the present disclosure are not limited to the objectives mentioned above, and other objectives not mentioned will be clearly understood by those skilled in the art from the following description.

A flow path switching device of the present disclosure includes flow path switching device includes: a case comprising a first nozzle into which fluid is introduced, a second nozzle through which fluid is discharged, a plurality of inner outflow pipes through which fluid supplied from the first nozzle flows, a plurality of inner inflow pipes through which the fluid supplied to the second nozzle flows, and a flow path connection portion in which a space is formed to communicate the plurality of inner outflow pipes with the first nozzle or to communicate the plurality of inner inflow pipes with the second nozzle; a valve rotatably disposed in the space of the flow path connection portion, and having a first chamber connecting one of the plurality of inner inflow pipes and the first nozzle according to placement, and a second chamber connecting one of the plurality of inner outflow pipes and the second nozzle; and a motor disposed in one side of the valve and rotating the valve. Each of the first nozzle, the inner outflow pipe, and the flow path connection portion may form a flow path perpendicular to each other inside, a first chamber hole connecting the first chamber and a nozzle flow path formed inside the first nozzle may be formed in the valve, and a cross-sectional area of the nozzle flow path may be reduced to a size corresponding to the first chamber hole from an inlet portion of the first nozzle towards the flow connection portion, thereby ensuring stably supply of the fluid from the first nozzle into the first chamber.

The plurality of inner outflow pipes and the plurality of inner inflow pipes may be disposed in a same direction on one side of the flow path connection portion, and may be spaced apart from each other in a direction in which a rotation shaft around which the valve rotates is formed, so that the flow path switching device may be compactly configured and disposed.

The nozzle flow path may include a first nozzle flow path extending from an inlet of the first nozzle while maintaining a cross-sectional area, and a second nozzle flow path connected to the first nozzle flow path with a reduced cross-sectional area, so that water flowing in the nozzle flow path can flow into the valve through the first nozzle flow path and the second nozzle flow path.

An area of the first chamber hole disposed in a region where the first nozzle is located may be smaller than the cross-sectional area of the first nozzle flow path and larger than or equal to the cross-sectional area of an outlet portion of the second nozzle flow path, thereby preventing water from the first nozzle from leaking to an outside of the valve.

The valve may include a first valve body forming the first chamber, a second valve body forming the first chamber, and a partition plate disposed between the first valve body and the second valve body, the first valve body may include a pair of outer walls forming the first chamber and spaced apart from each other, and in the first valve body, a plurality of chamber holes may be formed in a vertical direction relative to the first chamber.

The pair of outer walls may have surfaces facing each other formed in parallel, and surfaces opposite to the surfaces facing each other may be convex curved surfaces, so that flow resistance to water supplied from the first nozzle to the inner outflow pipe is minimized.

The valve may further include a rotation shaft disposed on one side of the first valve body and connected to the motor, a distance between both ends of the nozzle flow path spaced apart from each other in a direction perpendicular to the rotation shaft may decrease from the inlet portion of the first nozzle toward the flow path connection portion, and the distance between the both ends of the nozzle flow path spaced apart from each other in the direction perpendicular to the rotation shaft may be, at an outlet portion of the nozzle flow path, equal to or smaller than a distance between the pair of outer walls, thereby preventing water flowing from the first nozzle from leaking outside of the valve.

The valve may further include a guide plate disposed between the pair of outer walls and forming an inclined surface to guide a fluid flowing from the first nozzle to the first inner outflow pipe or the second inner outflow pipe, thereby supplying water flowing in the first nozzle to one of the plurality of inner outflow pipe.

The guide plate may be disposed below the first nozzle to direct the fluid supplied to the first nozzle to the first inner outflow pipe or the second inner outflow pipe according to placement of the valve, thereby minimizing a flow path of water.

A plurality of inflow holes communicating with the second chamber may be formed in each of the plurality of inner inflow pipes, a plurality of valve holes may be formed in the valve to communicate the inside of the second chamber and each of the plurality of inner inflow pipes, and each of the plurality of inflow holes may be of a size smaller than or equal to a size of the valve hole, thereby preventing leakage of water flowing from the inner inflow pipes to the second chamber.

The plurality of inner inflow pipes may include a first inner inflow pipe forming a first inflow hole, and a second inner inflow pipe spaced apart from the first inner inflow pipe in a direction in which the rotation shaft is formed and forming a second inflow hole, the plurality of valve holes may include: a first valve hole communicating with the first inflow hole according to the arrangement of the valve, and a second valve hole communicating with the second inflow hole according to placement of the valve, and the first inflow hole or the second inflow hole may be of a size equal to or smaller than a size of the first valve hole or the second valve hole, thereby preventing water flowing from the inner inlet pipe to the second chamber from leaking outside of the valve.

The valve may include a first valve body forming the first chamber, a second valve body forming the first chamber, and a partition plate disposed between the first valve body and the second valve body, the second valve body may have an internally hollow cylindrical shape, and the first valve hole and the second valve hole may be disposed with a phase difference of 180 degrees from each other on a circumferential surface of the second valve body, thereby selectively supplying water flowing from the plurality of inner inflow pipes to the second chamber.

The second nozzle may extend in a direction parallel to the rotation shaft of the valve at a distal end of the flow path connection portion, the partition plate may be disposed at one end of the second valve body, and a nozzle connection hole communicating the inside of the second chamber and the second nozzle may be formed at the other end.

The valve may include a first valve body forming the first chamber, a second valve body forming the first chamber, a partition plate disposed between the first valve body and the second valve body, and a rotation shaft disposed on one side of the first valve body and connected to the motor. The first valve body comprises a pair of outer walls spaced apart from each other, the outer walls where surfaces facing each other are formed in parallel and surfaces opposite to the surfaces facing each other are convex curved surfaces, thereby minimizing flow resistance of water flowing up and down. In addition, the second valve body may have an internally hollow cylindrical shape, and a plurality of valve holes communicating the insides of the second chamber and the plurality of inner inflow pipes are formed on a circumferential surface, thereby allowing water to flow in a vertical direction.

The first valve body may include a guide plate inclinedly disposed between the pair of outer walls, and the first nozzle may be disposed in a direction perpendicular to an imaginary line extending from the rotation shaft in a region where the guide plate is located, thereby minimizing flow resistance of water flowing in a vertical direction. In addition, the second nozzle may be disposed in a direction parallel to the imaginary line extending from the rotation shaft, thereby allowing water to flow in a vertical direction through the second chamber.

Details of other embodiments are included in the detailed description and drawings.

According to a flow path switching device of the present disclosure, there are one or more of the following effects.

First, the flow path connection portion connected to the indoor unit may be disposed on only one side of the plurality of inner inflow pipes and the plurality of inner outflow pipes or may be disposed on both sides of the plurality of inner inflow pipes, and thus, there is an advantage of being redesigned according to a size or shape of a space where the flow path switching device is disposed.

Second, since there is a structure in which fluid flowing through the first nozzle is supplied to the plurality of inner outflow pipes via the guide plate, it is possible to minimize the extent of fluid flow within the valve. Thus, there is also an advantage of preventing heat loss of the fluid in a range in which heat exchange does not occur.

Third, there is an advantage in preventing leakage of water between the valve and the space where the valve is disposed inside the case by adjusting a size between a hole formed in the valve and a hole formed in the case corresponding thereto.

Effects of the present disclosure are not limited to the effects mentioned above, and other effects not mentioned will be clearly understood by those skilled in the art from the description of the claims.

BRIEF DESCRIPTION OF THE DRAWINGS

FIG. 7A is a view for explaining the flow of water through a first inner outflow pipe and a first inner inflow pipe connected to a first heat exchanger, FIG. 7B is a view for explaining the flow of water through a second inner outflow pipe and a second inner inflow pipe connected to a second heat exchanger, and FIG. 7C is a view showing a state where a valve closes the flow path switching device.

FIGS. 17A to 17C are views for explaining the flow of water according to the placement of a valve disposed at an upper side of the flow path switching device of FIG. 11A, wherein FIG. 17A is a view for explaining the flow of water through a first inner outflow pipe and a first inner inflow pipe connected to a first heat exchanger, FIG. 17B is a view for explaining the flow of water through a second inner outflow pipe and FIG. 17B is a view for explaining the flow of water through a second inner outflow pipe and a second inner inflow pipe connected to a second heat exchanger, and FIG. 17C is a view showing a state where a valve closes the flow path switching device.

DESCRIPTION OF EXEMPLARY EMBODIMENTS

Figure 1:
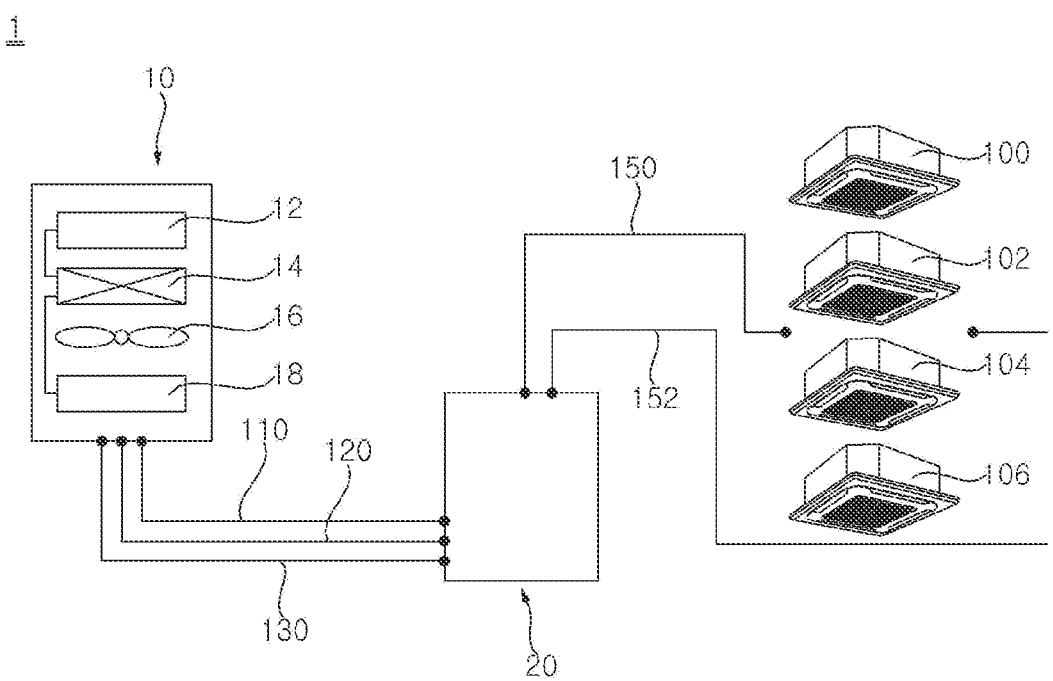
FIG. 1 is a schematic diagram of an air conditioner according to an embodiment of the present disclosure.

Advantages and features of the present disclosure and a method of achieving the same should become clear with embodiments described in detail below with reference to the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

In FIGS. 3 to 16C, indications of up (U), down (D), left (Le), right (Ri), front (F), and rear (R) are for explanation of the disclosure and do not limit the disclosure. In a flow path switching device described in FIGS. 3 to 16C, a first direction (F-R), a second direction (U-D), and a third direction (Ri-Le) are directions perpendicular to each other and are a reference defined for description of the disclosure. It is obvious that this can be applied differently if the viewing direction or reference is different. "Upper" and "lower" used as terms in the description or claims are for describing the disclosure with reference to drawings according to embodiments, and do not limit a position.

Hereinafter, the present disclosure will be described with reference to drawings for explaining an air conditioner including a flow path switching device according to embodiments of the present disclosure.

<Overall Composition>

Referring to FIG. 1, an air conditioner 1 according to an embodiment of the present disclosure may include an outdoor unit 10, a plurality of indoor units 100, 102, 104, 106 connected to the outdoor unit 10 to adjust the temperature of an indoor space, and a relay device 20 in which a refrigerant circulating in the outdoor unit 10 and water circulating in the plurality of indoor units 100, 102, 104, 106 exchange heat.

The air conditioner 1 may include three refrigerant pipes 110, 120, and 130 connecting the outdoor unit 10 and the relay device 20. That is, the outdoor unit 10 and the relay device 20 may have a "three pipe connection structure." The refrigerant may circulate between the outdoor unit 10 and the relay device 20 through the three refrigerant pipes 110, 120, and 130.

The three refrigerant pipes 110, 120, and 130 may include a high-pressure gas pipe 110 through which high-pressure gaseous refrigerant flows, a low-pressure gas pipe 120 through which low-pressure gaseous refrigerant flows, and a liquid pipe 130 through which liquid refrigerant flows. The high-pressure gas pipe 110 may be connected to the discharge side of the compressor 12 disposed in the outdoor unit 10. The low pressure gas pipe 120 may be connected to a suction side of the compressor 12. The liquid pipe 130 may be connected to the outdoor heat exchanger 14 disposed in the outdoor unit 10.

The air conditioner 1 may include a plurality of water pipes connecting the relay device 20 and each of the plurality of indoor units 100, 102, 104, and 106. Each of the plurality of indoor units 100, 102, 104, and 106 may be connected to a water supply pipe 150 through which water is supplied from the relay device 20 and a water discharge pipe 152 through which water is discharged to the relay device 20. The water pipe includes a water supply pipe 150 and a water discharge pipe 152. The water supply pipe 150 and the water discharge pipe 152 may be provided to correspond to the number of indoor units 100, 102, 104, and 106.

The outdoor unit 10 may include a simultaneous cooling/heating type outdoor unit. The outdoor unit 10 and the relay device 20 may be fluidly connected by a first fluid. The first fluid may include a refrigerant.

The outdoor unit 10 may include a compressor 12 for compressing refrigerant, an outdoor heat exchanger 14 that is disposed inside the outdoor unit and exchanges heat between external air and the refrigerant, and an outdoor fan 16 that is disposed in one side of the outdoor heat exchanger 14 and forms air flow to the outdoor heat exchanger 14. Heat exchange between the refrigerant and the air may be achieved as the outdoor air flows into the outdoor heat exchanger 14 by the driving of the outdoor fan 16.

In addition, the outdoor unit 10 may further include an outdoor expansion valve 18 that expands the refrigerant that is discharged from the outdoor heat exchanger 14 or supplied to the outdoor heat exchanger 14.

The plurality of indoor units 100, 102, 104, and 106 may include a simultaneous heating/cooling type indoor unit. Each of the plurality of indoor units 100, 102, 104, and 106 and the relay device may be fluidly connected by a second fluid. The second fluid may include water.

Each of the plurality of indoor units 100, 102, 104, and 106 may include an indoor heat exchanger (not shown) disposed inside the indoor unit 100, 102, 104, and 106 to exchange heat between indoor air and water, and an indoor fan (not shown) disposed in one side of the indoor heat exchanger (not shown) to form an air flow to the indoor heat exchanger.

<Relay Device>

Figure 2:
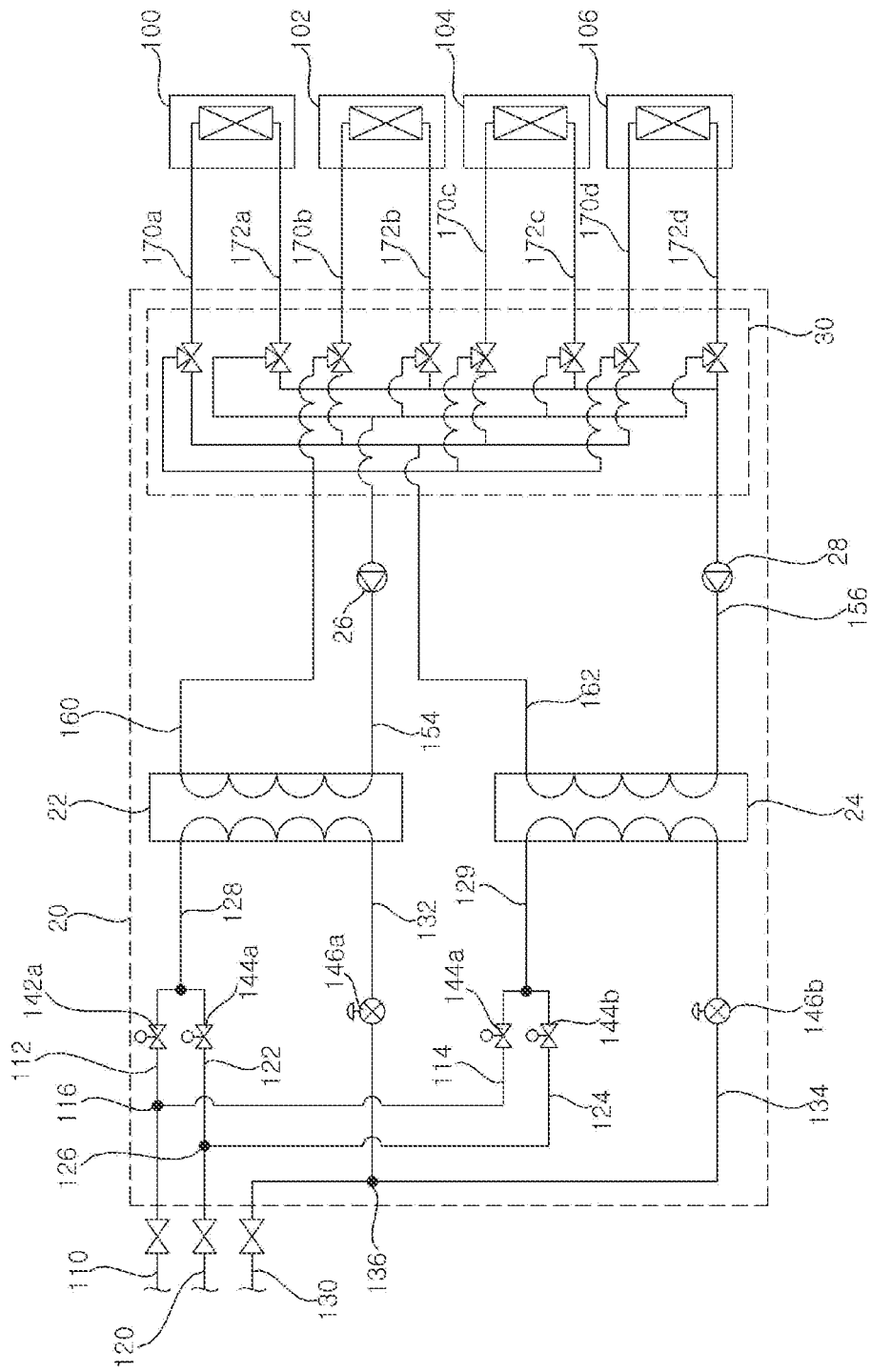
FIG. 2 is a schematic diagram illustrating a connection relationship between a relay device and a plurality of indoor units according to an embodiment of the present disclosure.

Referring to FIG. 2, the relay device 20 includes a heat exchanger 22, 24 for exchanging heat between the refrigerant and water, a pump 26, 28 for forming a flow of water flowing through the water pipe, a plurality of refrigerant valves that are disposed in the refrigerant pipe 110, 120, and 130 disposed inside the relay device 20 and control the flow of the refrigerant, and a flow path switching device 30 that is disposed in a water pipe disposed inside the relay device 20 and controls the flow of water.

Inside the relay device 20, the refrigerant pipe 110, 120, 130 connecting the outdoor unit 10 and the heat exchanger 22, 24, and the water pipe connecting the plurality of indoor units 100, 102, 104 and 106 and the heat exchanger 22, 24 are disposed.

Referring to FIG. 2, the refrigerant pipe 110, 120, 130 may include a high-pressure gas pipe 110 in which a high-pressure gaseous refrigerant flows, a low-pressure gas pipe 120 in which a low-pressure gaseous refrigerant flows, and a liquid pipe 130 through which liquid refrigerant flows.

The high-pressure gas pipe 110 may include a first high-pressure guide pipe 112 connected to a first heat exchanger 22 and a second high-pressure guide pipe 114 connected to a second heat exchanger 24. In the high-pressure gas pipe 110, a high-pressure branch point 116 branching into the first high-pressure guide pipe 112 and the second high-pressure guide pipe 114 may be formed.

The low pressure gas pipe 120 may include a first low pressure guide pipe 122 connected to the first heat exchanger 22 and a second low pressure guide pipe 124 connected to the second heat exchanger 24. In the low-pressure gas pipe 120, a low-pressure branch point 126 branching into the first low-pressure guide pipe 122 and the second low-pressure guide pipe 124 may be formed.

The first low pressure guide pipe 122 and the first high pressure guide pipe 112 may be joined to a first refrigerant pipe 128 and connected to the first heat exchanger 22, and the second low pressure guide pipe 124 and the second high-pressure guide pipe 114 may be joined to a second refrigerant pipe 129 and connected to the second heat exchanger 24.

The liquid pipe 130 includes a first liquid guide pipe 132 connected to the first heat exchanger 22 and a second liquid guide pipe 134 connected to the second heat exchanger 24. A liquid pipe branch point 136 branching into the first liquid guide pipe 132 and the second liquid guide pipe 134 may be formed in the liquid pipe 130.

Referring to FIG. 2, the plurality of refrigerant valves may change the flow direction of the refrigerant by operating the valve. In addition, the plurality of refrigerant valves may adjust the flow rate of the refrigerant by operating the valve.

The plurality of refrigerant valves may include a high-pressure valve 142*a* and 142*b* that is disposed in each of the first high-pressure guide pipe 112 and the second high-pressure guide pipe 114 to open and close the first high-pressure guide pipe 112 and the second high-pressure guide pipe 114, a low-pressure valve 144 *a* and 144 *b* that is disposed in each of the first low-pressure guide pipe 122 and the second low-pressure guide pipe 124 to open and close the first low-pressure guide pipe 122 and the second low-pressure guide pipe 124, and a liquid pipe valve 146 *a* and 146 *b* that is disposed in the first liquid guide pipe 132 and the second liquid guide pipe 134 to adjust the flow rate of the refrigerant flowing through the refrigerant pipe 110, 120, 130.

Referring to FIG. 2, the water pipe may include an inflow pipe 154, 156 for guiding water to flow into the heat exchanger 22, 24 and a discharge pipe 160, 162 for guiding water discharged from the heat exchangers 22, 24.

The inflow pipe 154, 156 may guide water passing through the indoor unit 100, 102, 104, 106 to flow into the heat exchanger 22, 24. The discharge pipe 160, 162 may guide water passing through the heat exchanger 22, 24 to flow to the indoor unit 100, 102, 104, 106.

The inflow pipe 154, 156 may include a first inflow pipe 154, 156 for guiding water to the first heat exchanger 22 and a second inflow pipe 154, 156 for guiding water to the second heat exchanger 24. The discharge pipe 160, 162 may include a first discharge pipe 160, 162 for guiding water passing through the first heat exchanger 22 to the indoor unit 100, 102, 104, 106 and a second discharge pipe 160, 162 for guiding water passing through the second heat exchanger 24 to the indoor unit 100, 102, 104, 106.

The first inflow pipe 154, 156 may extend to the water inlet of the first heat exchanger 22. The first discharge pipe 160, 162 may extend from the water outlet of the first heat exchanger 22. Likewise, the second inflow pipe 154, 156 may extend to the water inlet of the second heat exchanger 24. The second discharge pipe 160, 162 may extend from the water outlet of the second heat exchanger 24.

Each of the inflow pipe 154, 156 and the discharge pipe 160, 162 may extend to the flow path switching device 30. The water flowed to the water inlet of the heat exchanger 22, 24 from the inflow pipe 154, 156 may exchange heat with the refrigerant, and then flow to the water discharge pipe 160, 162 through the water outlet of the heat exchanger 22, 24.

The water pipe may include a plurality of indoor inflow pipes 170*a*, 170*b*, 170*c*, and 170*d* guiding water to flow into each of the plurality of indoor units 100, 102, 104, 106, and a plurality of indoor discharge pipes 172a, 172b, 172c, 172d guiding water discharged from each of the plurality of indoor units 100, 102, 104, 106.

Each of the plurality of indoor inflow pipes 170a, 170b, 170c, and 170d and the plurality of indoor discharge pipes 172a, 172b, 172c, and 172d is connected to the flow path switching device 30.

The plurality of indoor inflow pipes 170a, 170b, 170c, and 170d may include a first indoor inflow pipe 170a coupled to the inlet of a first indoor unit 100, a second indoor inflow pipe 170b coupled to the inlet of a second indoor unit 102, a third indoor inflow pipe 170c coupled to the inlet of a third indoor unit 104, and a fourth indoor inflow pipe 170d coupled to the inlet of a fourth indoor unit 106. Each of the first indoor inflow pipe 170a, the second indoor inflow pipe 170b, the third indoor inflow pipe, and the fourth indoor inflow pipe 170d is connected to the flow path switching device 30.

The indoor discharge pipe 172a, 172b, 172c, and 172d may include a first indoor discharge pipe 172a coupled to the outlet of the first indoor unit 100, a second indoor discharge pipe 172b coupled to the outlet of the second indoor unit 102, a third indoor discharge pipe 172c coupled to the outlet of the third indoor unit 104, and a fourth indoor discharge pipe 172d coupled to the outlet of the fourth indoor unit 106. Each of the first indoor discharge pipe 172a, the second indoor discharge pipe 172b, the third indoor discharge pipe, and the fourth indoor discharge pipe 172d is connected to the flow path switching device 30.

Referring to FIG. 2, the heat exchanger 22, 24 may be provided so that the refrigerant flow path and the water flow path exchange heat with each other. The heat exchanger 22, 24 may include a plate type heat exchanger capable of exchanging heat between water and the refrigerant. The heat exchanger 22, 24 may be configured such that a flow path through which refrigerant flows and a flow path through which water flows are alternately stacked.

A plurality of heat exchangers 22, 24 may be provided to simultaneously provide cooling and heating to each of the plurality of indoor units 100, 102, 104, and 106. Referring to FIG. 2, the heat exchanger 22, 24 may include a first heat exchanger 22 and a second heat exchanger 24. The first heat exchanger 22 may heat water by exchanging heat with the refrigerant, and the second heat exchanger 24 may cool the water by exchanging heat with the refrigerant.

However, this is just one embodiment, and a structure in which the first heat exchanger 22 cools water and the second heat exchanger 24 heats water, or a structure in which the first heat exchanger 22 and the second heat exchanger 24 alternately cool or heat water may be possible.

Water flowing through the water pipe is selectively flowed into the first heat exchanger 22 or the second heat exchanger 24 according to the operation mode of the indoor unit 100, 102, 104, and 106 to exchange heat with the refrigerant.

Referring to FIG. 2, the pump 26, 28 may provide pressure so that water in inflow pipe 154, 156 is directed to heat exchanger 22, 24. The pump 26, 28 may be installed in the water pipe to set the flow direction of the second fluid.

The pump 26, 28 may include a first pump 26 installed in the first inflow pipe 154, 156 and a second pump 28 installed in the second inflow pipe 154, 156.

The pump 26, 28 may force the flow of water. When the first pump 26 is operated, the water passing through the first heat exchanger 22 may flow to the plurality of indoor units 100, 102, 104, and 106 via the flow path switching device 30. Similarly, when the second pump 28 is operated, the water passing through the second heat exchanger 24 may flow to the plurality of indoor units 100, 102, 104, and 106 via the flow path switching device 30.

<Flow Path Switching Device>

Hereinafter, the flow path switching device 30 will be described with reference to FIGS. 2 to 16C.

Referring to FIG. 2, the flow path switching device 30 sends water flowing through the first heat exchanger 22 or the second heat exchanger 24 to each of the plurality of indoor units 100, 102, 104, 106, and sends water flowing through each of the plurality of indoor units 100, 102, 104, and 106 to the first heat exchanger 22 or the second heat exchanger 24. The flow path switching device 30 is connected to the first heat exchanger 22 and the second heat exchanger 24 through the inflow pipe 154, 156 and the discharge pipe 160, 162. The flow path switching device 30 is connected to each of a plurality of indoor units 100, 102, 104, and 106 through a plurality of indoor inflow pipes 170a, 170b, 170c, and 170d and a plurality of indoor discharge pipes 172a, 172b, 172c, and 172d.

First, with reference to FIGS. 3A to 10C, a flow path switching device according to a first embodiment will be described.

Figure 3A:
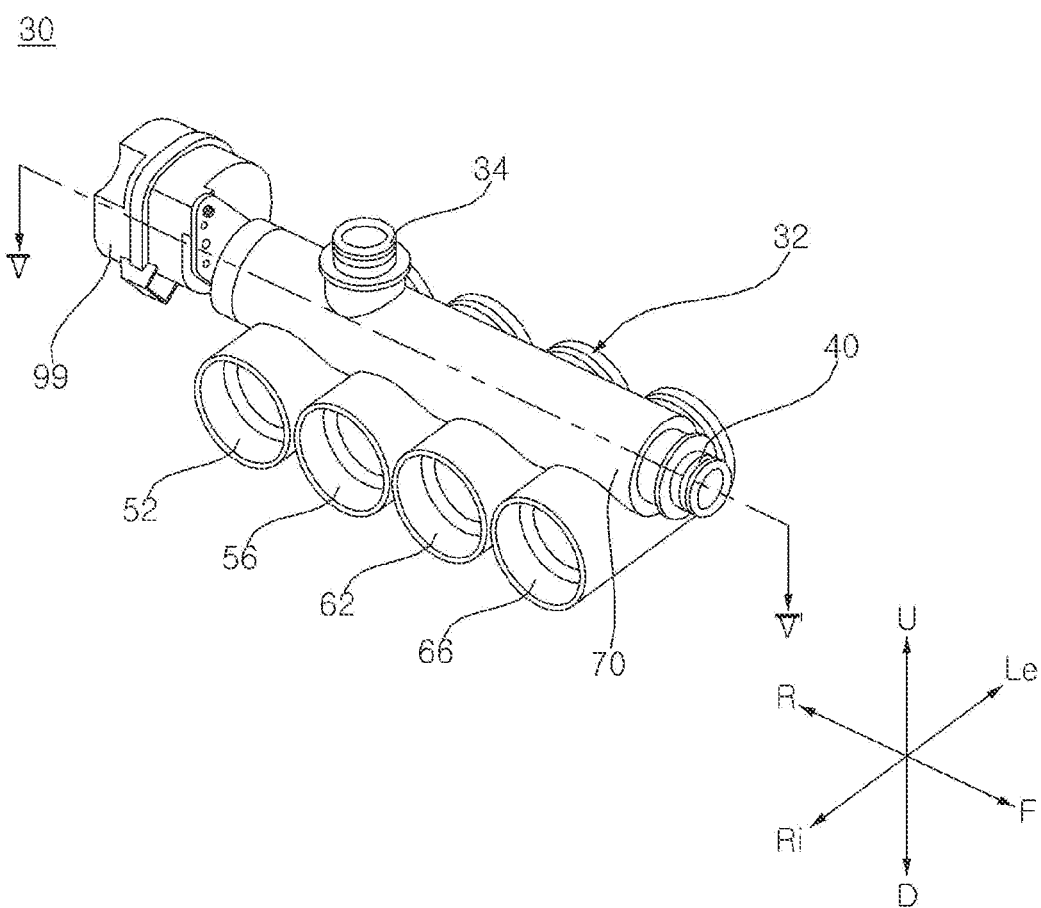
FIG. 3A is a perspective view of a flow path switching device according to a first embodiment of the present disclosure.
Figure 3B:
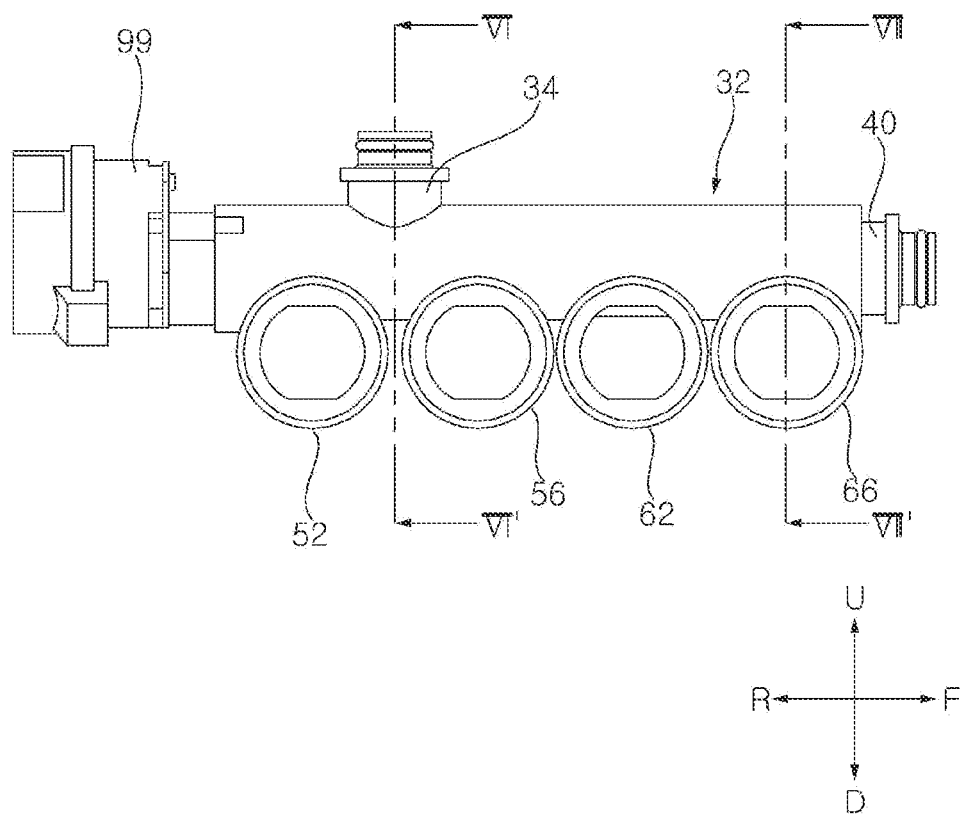
FIG. 3B is a side view of FIG. 3A
Figure 4:
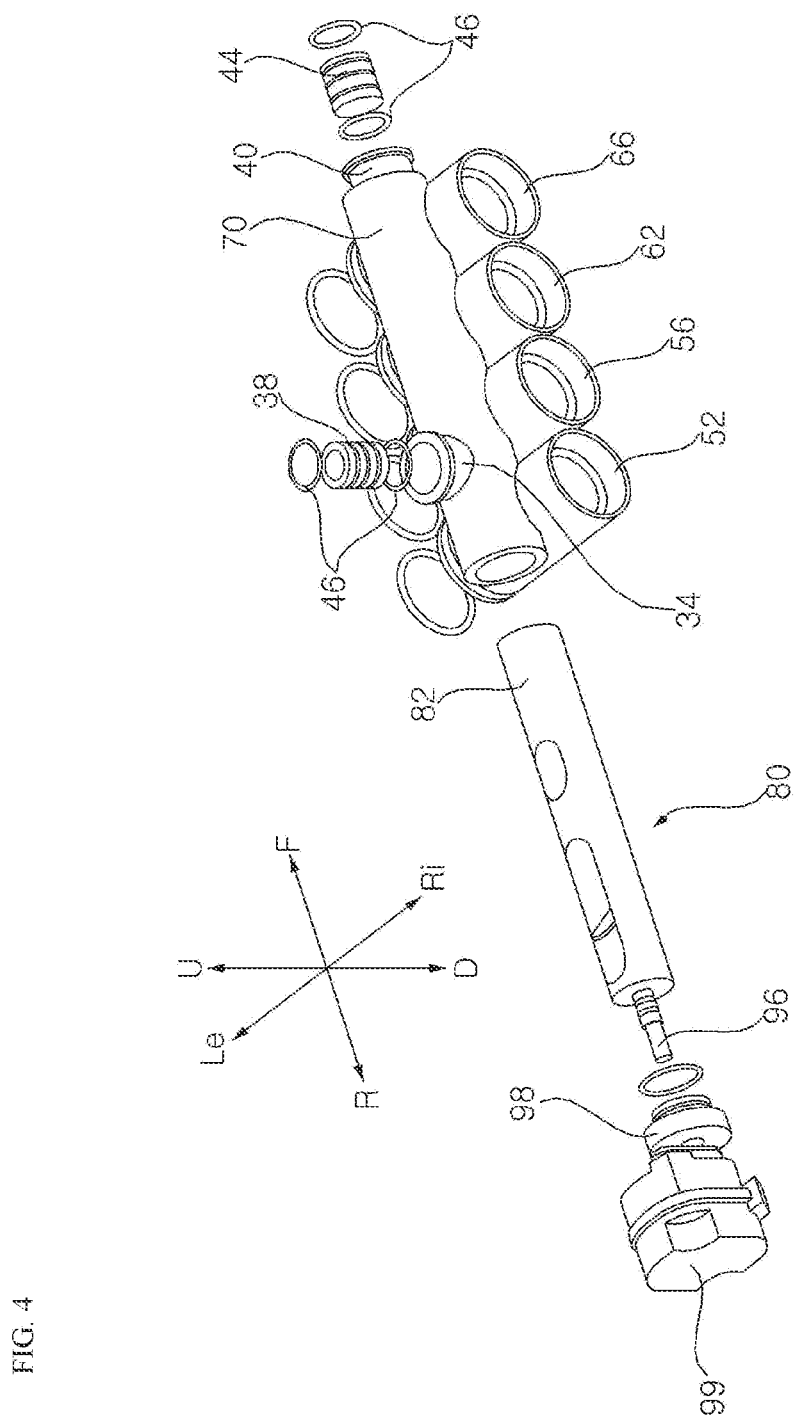
FIG. 4 is an exploded view of FIG. 3A.
Figure 5:
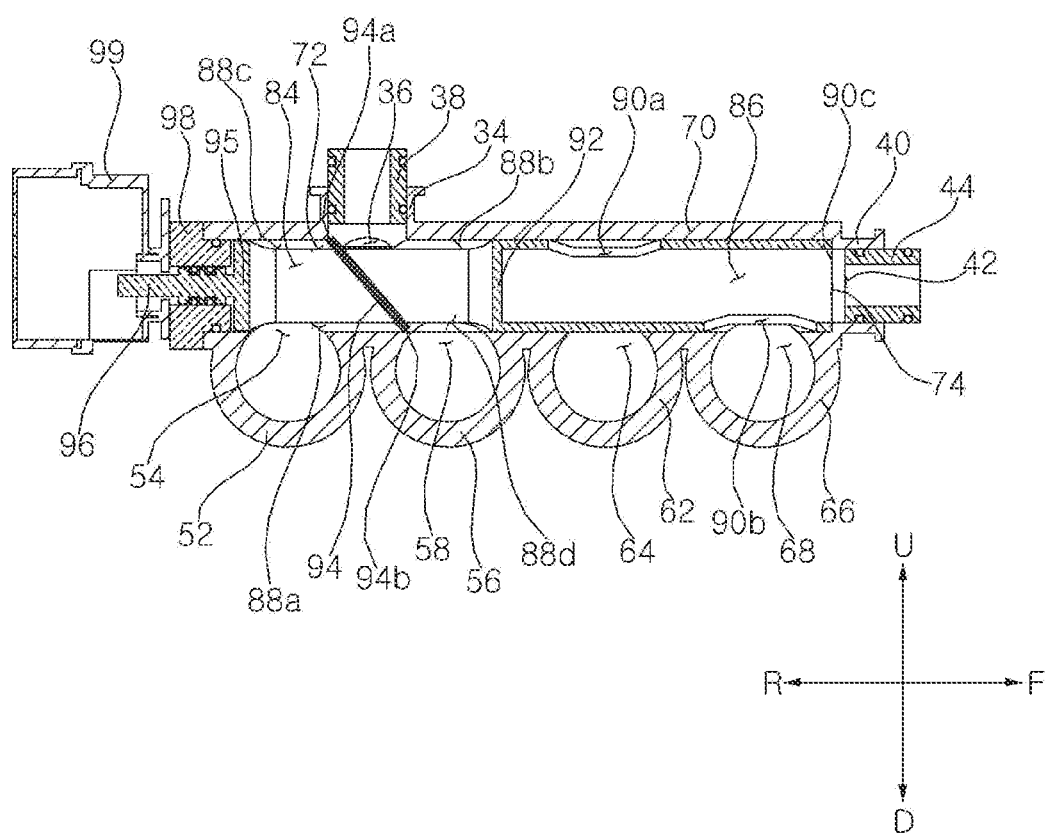
FIG. 5 is a cross-sectional view taken along line V-V' of FIG. 3A.

Referring to FIGS. 3 to 5, the flow path switching device 30 includes a case 32 including a first nozzle 34 into which fluid flows from the indoor unit 100, 102, 104, 106, a second nozzle 40 which sends the fluid to the indoor unit 100, 102, 104, 106, a plurality of inner inflow pipes 62 and 66 through which the fluid heat-exchanged from the heat exchanger 22, 24 flows, a plurality of inner outflow pipes 52, 56 for sending the fluid supplied from the first nozzle 34 to the heat exchanger 22, 24, and a flow path connection portion 70 in which a space 72, 74 is formed to communicate the first nozzle 34 or to communicate the plurality of inner outflow pipes 52 and 56 and the second nozzle 40; a valve 80 that is rotatably disposed in the space 72, 74 of the flow path connection portion 70, connects one pipe among the plurality of inner outflow pipes 52 and 56 to the first nozzle 34 according to the placement of the valve 80, and connects one of the plurality of inner inflow pipes 62 and 66 to the second nozzle 40; and a motor 99 disposed in one side of the valve 80 to rotate the valve 80.

Referring to FIG. 3, the case 32 includes a plurality of inner outflow pipes 52 and 56 and a plurality of inner inflow pipes 62 and 66. Referring to FIG. 5, each of the plurality of inner outflow pipes 52 and 56 and the plurality of inner inflow pipes 62 and 66 are disposed parallel to a rotation shaft % on which the valve 80 rotates.

The plurality of inner outflow pipes 52 and 56 and the plurality of inner inflow pipes 62 and 66 are disposed in the same direction on one side of the flow path connection portion 70, and are disposed spaced apart from each other in a direction in which a rotation shaft around which the valve 80 rotates is formed. The plurality of inner outflow pipes 52 and 56 include a first inner outflow pipe 52 connected to the first heat exchanger 22 and a second inner outflow pipe 56 connected to the second heat exchanger 24. The plurality of inner inflow pipes 62 and 66 include a first inner inflow pipe 62 connected to the first heat exchanger 22 and a second inner inflow pipe 66 connected to the second heat exchanger 24.

The space 72, 74 formed inside the flow path connection portion 70 may be partitioned into a first space 72 communicating the first nozzle 34, and a second space 74 communicating the plurality of inner outflow pipes 52 and 56 and the second nozzle 40.

In each of the first inner outflow pipe 52 and the second inner outflow pipe 56, a first outflow hole 54 and a second outflow hole 58 communicating with the first space 72 of the flow path connection portion 70 is formed. Each of the first outflow hole 54 and the second outflow hole 58 is opened in a direction perpendicular to a pipe direction of the first inner outflow pipe 52 and the second inner outflow pipe 56.

In each of the first inner inflow pipe 62 and the second inner inflow pipe 66, a first inflow hole 64 and a second inflow hole 68 that communicate with the second space 74 of the flow path connection portion 70 are formed. Each of the first inflow hole 64 and the second inflow hole 68 is opened in a direction perpendicular to the pipe direction of each of the first inner inflow pipe 62 and the second inner inflow pipe 66.

The first inner outflow pipe 52 is connected to the first heat exchanger 22 so that water heated in the first heat exchanger 22 may flow. The second inner outflow pipe 56 is connected to the second heat exchanger 24 so that water cooled in the second heat exchanger 24 may flow.

The first inner outflow pipe 52 and the second inner outflow pipe 56 are disposed adjacent to each other, and the first inner inflow pipe 62 and the second inner inflow pipe 66 are disposed adjacent to each other.

Referring to FIG. 5, each of the first inner inflow pipe 62, the second inner outflow pipe 56, the first inner inflow pipe 62, and the second inner inflow pipe 66 is disposed parallel to the rotation shaft 96 on which the valve 80 rotates. Each of the first inner inflow pipe 62, the second inner outflow pipe 56, the first inner inflow pipe 62, and the second inner inflow pipe 66 is disposed parallel to a first direction (F-R) parallel to the rotation shaft 96 of the valve 80.

Referring to FIG. 5, each of the first inflow hole 64, the second inflow hole 68, the first outflow hole 54, and the second outflow hole 58 is formed in the same direction. Each of the first inflow hole 64, the second inflow hole 68, the first outflow hole 54, and the second outflow hole 58 is opened in the second direction (U-D) perpendicular to the first direction (F-R).

The case 32 includes a first nozzle 34 that receives the fluid discharged from the indoor unit 100, 102, 104, 106, and sends it to the first inner outflow pipe 52 or the second inner outflow pipe 56, and a second nozzle 40 that sends the fluid supplied from the first inner inflow pipe 62 or the second inner inflow pipe 66 to the indoor unit 100, 102, 104, 106.

The first nozzle 34 may be connected to the indoor discharge pipe 172a. 172b. 172c, and 172d so that water discharged from the indoor unit 100, 102, 104, and 106 may be supplied. The first nozzle 34 is connected to the first inner outflow pipe 52 or the second inner outflow pipe 56 so that the water discharged from the indoor unit 100, 102, 104, and 106 is sent to the first heat exchanger 22 or sent to the second heat exchanger 24.

Referring to FIG. 5, the first nozzle 34 is disposed in the opposite direction of the first inner outflow pipe 52 and the second inner outflow pipe 56 based on the flow path connection portion 70. The first nozzle 34 extends in a direction perpendicular to the rotation shaft 96 of the valve 80. The first nozzle 34 is disposed between the first inner outflow pipe 52 and the second inner outflow pipe 56, based on the second direction U-D perpendicular to the rotation shaft 96 of the valve 80.

In the first nozzle 34, a first nozzle hole 36 communicating with the first space 72 of the flow path connection portion 70 is formed.

A first connection member 38 connected to the indoor discharge pipe 172a, 172b, 172c, and 172d is disposed in the first nozzle 34. The first connection member 38 is fixedly disposed inside the first nozzle 34 and the indoor discharge pipe 172a, 172b, 172c, and 172d, and may be in close contact with each of the indoor discharge pipe 172a. 172b, 172c, and 172d and the first nozzle 34 by a sealer 46.

Figure 6A:
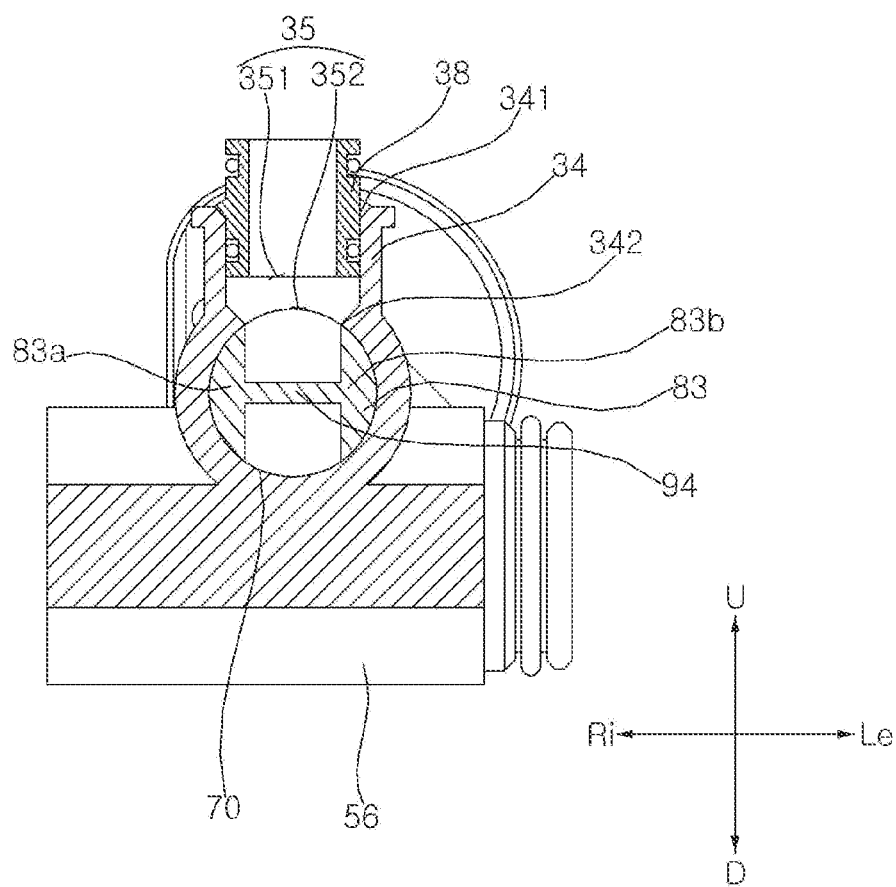
FIG. 6A is a cross-sectional view taken along line VI-VI' of FIG. 3B.

Referring to FIG. 6A, the first nozzle 34 has a nozzle flow path 35 through which water flows. The nozzle flow path 35 is formed to narrow down the cross-sectional area at a portion connected to the flow path connection portion 70. The nozzle flow path 35 may include a first nozzle flow path 351 extending from an inlet 341 of the first nozzle 35 while maintaining a cross-sectional area, and a second nozzle flow path 352 connected to the first nozzle flow path 351 with a reduced cross-sectional area. The cross-sectional area of the second nozzle flow path 352 reduces in a direction away from the first nozzle flow path 351.

The first nozzle 34 is formed such that an end thereof connected to the flow path connection portion 70 contacts one end of a pair of outer walls 83a and 83b of a first valve body 83 which will be described later.

Referring to FIG. 5, when viewed from a direction parallel to the rotation shaft 96, a distance between both ends of the first nozzle flow path 351 and the second nozzle flow path 352 may be uniformly maintained. However, referring to FIG. 6A, when viewed from a direction perpendicular to the rotation shaft 96, the second nozzle flow path 352 may have a shape so that a distance between the both ends decreases in a direction closer to the flow path connection portion 70.

The second nozzle 40 may send water supplied through the first inner inflow pipe 62 or the second inner inflow pipe 66 to the indoor unit 100, 102, 104, and 106. The second nozzle 40 is connected to the indoor inflow pipe 170a, 170b, 170c, and 170d, and supplies water supplied from the first heat exchanger 22 or the second heat exchanger 24 to the indoor unit 100, 102, 104, 106.

Referring to FIG. 5, the second nozzle 40 is disposed in a distal end of the flow path connection portion 70. The second nozzle 40 extends in a direction parallel to the rotation shaft 96 of the valve 80. The second nozzle 40 is disposed in the opposite direction to the motor 99. The second nozzle 40 extends in the opposite direction to the motor 99 in the first direction F-R.

In the second nozzle 40, a second nozzle hole 42 communicating with the second space 74 of the flow path connection portion 70 is formed.

A second connection member 44 connected to the indoor inflow pipe 170a, 170b. 170c, and 170d is disposed in the second nozzle 40. The second connection member 44 is fixedly disposed inside the second nozzle 40 and the plurality of indoor inflow pipes 170a, 170b, 170c, and 170d and may be in close contact with the plurality of indoor inflow pipe 170a, 170b, 170c, and 170d and the second nozzle 40 by the sealer 46.

Referring to FIG. 5, the flow path connection portion 70 forms a first space 72 connecting the first nozzle 34 and the first inner outflow pipe 52 or the second inner outflow pipe 56. The flow path connection portion 70 forms a second space 74 connecting the second nozzle 40 and the first inner inflow pipe 62 or the second inner inflow pipe 66.

The first space 72 and the second space 74 formed inside the flow path connection portion 70 are disposed in a direction parallel to the rotation shaft 96 of the valve 80 and communicate with each other. The first space 72 may communicate with each of the first inner outflow pipe 52 and the second inner outflow pipe 56 through the first outflow hole 54 and the second outflow hole 58. The second space 74 may communicate with each of the first inner inflow pipe 62 and the second inner inflow pipe 66 through the first inflow hole 64 and the second inflow hole 68.

Referring to FIGS. 4 and 5, the valve 80 includes: a valve body 82 that forms an outer appearance and forms a first chamber 84, connecting one of the plurality of inner outflow pipes 52 and 56 to the first nozzle 34, and a second chamber 86, connecting one of the plurality of inner inflow pipes and the second nozzle 40; and a partition plate 92 disposed inside the valve body 82 and partitioning the first chamber and the second chamber 86. The valve 80 includes a guide plate 94 that forms an inclined surface to guide water flowing from the first nozzle 34 to the first inner outflow pipe 52 or the second inner outflow pipe 56.

The valve body 82 may include a first valve body 83 forming the first chamber 84, a second valve body 85 forming the second chamber 86, and the partition plate 92 disposed between the first valve body 83 and the second valve body 85.

The first valve body 83 is hollow inside and has a substantially cylindrical shape. An end plate 95 connected to the rotation shaft 96 is disposed at one end of the first valve body 83, while the partition plate 92 is disposed at the other end. The first valve body 83 is disposed between the end plate 95 and the partition plate 92, and the pair of outer walls 83a and 83b connecting the end plate 95 and the partition plate 92 are disposed.

Referring to FIG. 6A, the pair of outer walls 83a and 83b may each have a substantially semicircular cross section. In the first valve body 83, the first chamber 84 is formed between the pair of outer walls 83a and 83b. On the upper and lower sides of the first chamber 84, a plurality of chamber holes 88a, 88b, 88c, 88d is disposed. Between the pair of outer walls 83a and 83b, a guide plate 84 is disposed. Referring to FIG. 5, the guide plate 84 is inclined below the first nozzle 34.

Referring to FIG. 6A, the pair of outer walls 83a and 83b may be divided into a first outer wall 83a and a second outer wall 83b. The first outer wall 83a and the second outer wall 83b may face each other and have symmetrical shapes.

Referring to FIG. 6A, in the first outer wall 83a and the second outer wall 83b, surfaces facing each other are formed in parallel to each other. In the first outer side wall 83a and the second outer side wall 83b, surfaces opposite to the surfaces facing each other are of convex curved surfaces.

One end or the other end of the first outer side wall 83a is disposed to be in contact with an outlet 342 of the first nozzle 34. One end or the other end of the second outer side wall 83b is placed in contact with the outlet 342 of the first nozzle 34.

Referring to FIG. 6A, an area of the chamber hole disposed in a region where the first nozzle 34 is located is formed smaller than a cross-sectional area of the first nozzle flow path 351 and larger than or equal to a cross-sectional area of the outlet portion 342 of the second nozzle flow path 352.

Figure 7A:
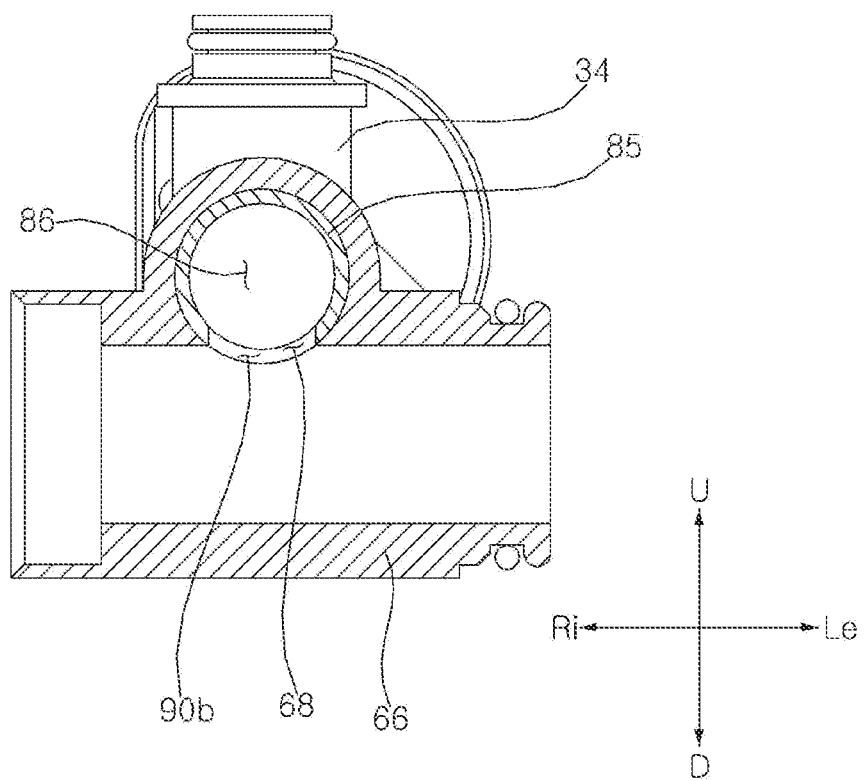
FIG. 7A is a cross-sectional view taken along line VII-VII' of FIG. 3B.

Referring to FIG. 7A, the second valve body 85 has hollow inside and a substantially cylindrical shape. The partition plate 92 is disposed at one end of the second valve body 85, while a nozzle connection hole 90c is formed at the other end. The second valve body 85 forms a circumference of the second chamber 86. In the second valve body 85, a first valve hole 90a and a second valve hole 90b are formed.

Referring to FIG. 5, the first valve hole 90a and the second valve hole 90b have a phase difference of 180 degrees from each other at positions corresponding to the first inner inflow pipe 62 and the second inner inflow pipe 66. Thus, the second chamber 86 may communicate with the first inner inflow pipe 62 or the second inner inflow pipe 66 according to the placement of the valve body 82.

Referring to FIG. 7A, the size of each of the first valve hole 90a and the second valve hole 90b respectively correspond to a size of a first inflow hole 64 formed in the first inner inflow pipe 62 or a size of a second inflow hole 68 formed in the second inner inflow pipe 66.

The size of each of the first valve hole 90a and the second valve hole 90b is equal to or larger than that of the first inflow hole 64 or the second inflow hole 68.

With reference to FIGS. 6A to 8, a leakage amount of the flow switching device according to the present disclosure will be described in comparison with a flow switching device according to a comparative example.

Referring to FIG. 6A, the nozzle flow path 35 of the flow path switching device according to the present disclosure is formed such that a cross-sectional area thereof is reduced at a portion connected to the flow path connection portion 70. The first nozzle 34 is formed such that an end thereof connected to the flow path connection portion 70 contacts one end of the pair of outer walls 83a and 83b of the first valve body 83. That is, an area of the chamber hole positioned in a region where the first nozzle 34 is located is greater than or equal to a cross-sectional area of the outlet portion 342 of the nozzle flow path 35. Thus, water flowing along the first nozzle 34 may flow into the first chamber 84 without being obstructed by the first valve body 83.

Figure 6B:
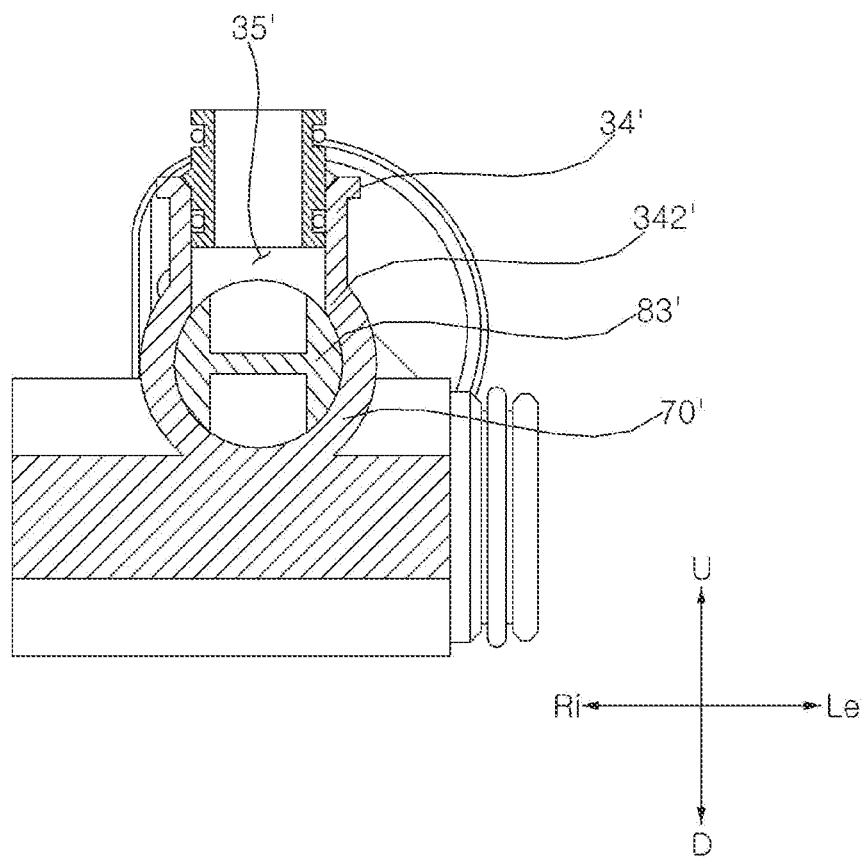
FIG. 6B is a comparison diagram of FIG. 6A.

On the other hand, referring to FIG. 6B, a nozzle flow path 35' of a flow path switching device according to a comparative example has the same cross-sectional area as a whole. Accordingly, an area of a chamber hole positioned in a region where a first nozzle 34' is located is smaller than a cross-sectional area of an outlet portion 342' of the nozzle flow path 35'. In this structure, water flowing from the first nozzle 34' may be obstructed by a first valve body 83'. In addition, water flowing from the first nozzle 34' may leak into a space between the first valve body 83' and a flow path connection portion 70'.

Referring to FIG. 7A, the second valve hole 90b has a size corresponding to the second inflow hole 68 formed in the second inner inflow pipe 66. Although not illustrated in the drawings, the first valve hole 90a may also have a size corresponding to that of the first inflow hole 64 formed in the first inner inflow pipe 62.

That is, the size of each of the first inflow hole 64 and the second inflow hole 68 is equal to or smaller than the size of the first valve hole 90a or the second valve hole 90b.

Thus, water flowing from any one of the plurality of inner inflow pipes 62 and 66 may naturally flow into the second chamber 86. That is, referring to FIG. 7A, water flowing from the second inner inflow pipe 66 to the second chamber 86 may flow without being obstructed by the second valve body 85.

Figure 7B:
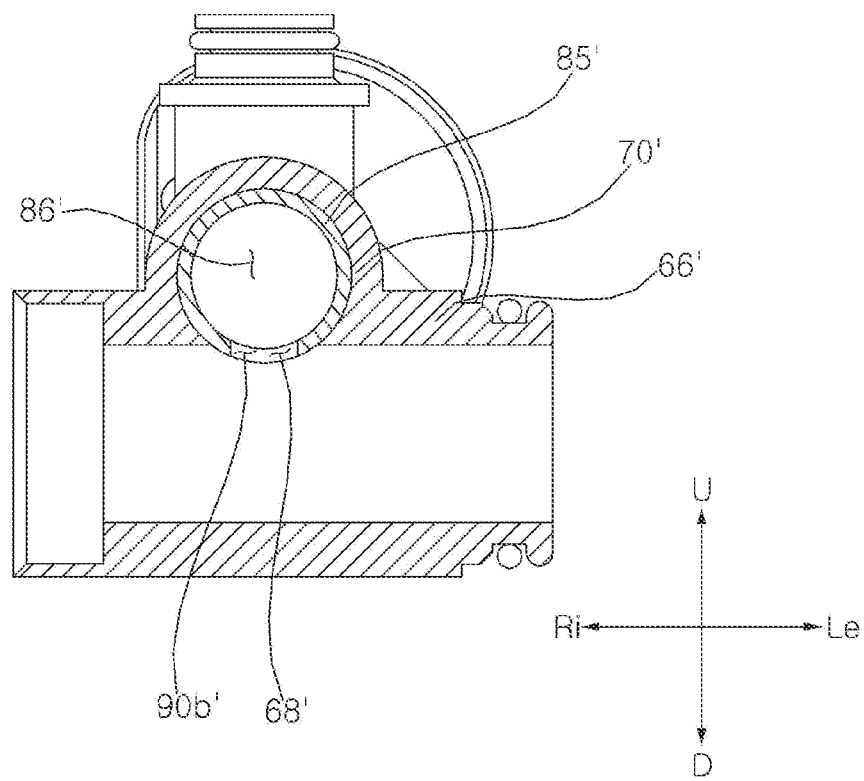
FIG. 7B is a comparison diagram of FIG. 7A.

On the other hand, referring to FIG. 7B, a size of a second inflow hole 68' is larger than that of a second valve hole 90b'. That is, water flowing from a second inner inflow pipe 66' to a second chamber 86' may be blocked by a second valve body 85'. This may cause water flowing from the second inner inflow pipe 66' to the second chamber 86' to leak into a space between the second valve body 85' and the flow path connection portion 70'.

Figure 8:
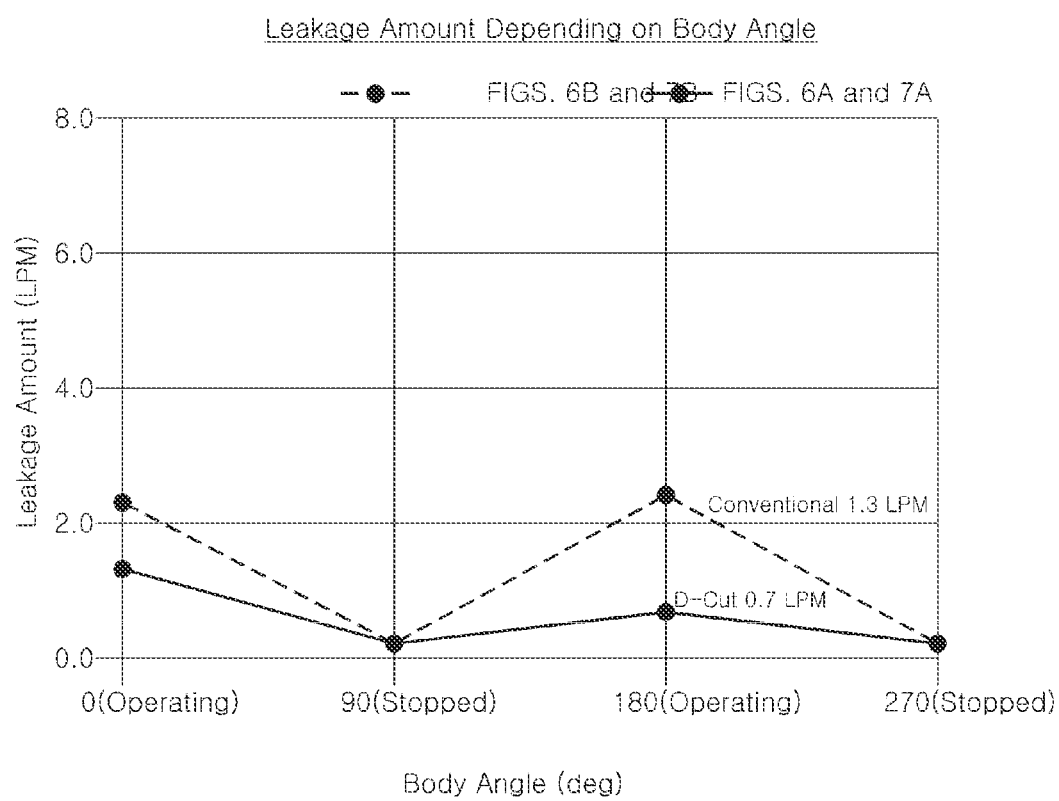
FIG. 8 is data for comparison in leakage between the flow path switching device of the present disclosure of FIGS. 6A and 7A and the flow path switching device of FIGS. 6B and 7B.

Therefore, referring to FIG. 8, it may be confirmed that a leakage amount significantly decreases when the flow path switching device according to the present disclosure operates, compared to the flow switching device according to the comparative example.

Referring to FIG. 5, the valve body 82 has a plurality of first chamber holes 88a, 88b, 88c. 88d connecting the first inner outflow pipe 52 or the second inner outflow pipe 56 and the first nozzle 34. The plurality of first chamber holes may include a first upper hole 88a that communicates with the first nozzle hole 36 or communicates with the first inner outflow pipe 52 according to the placement of the first upper hole 88a, and a second upper hole 88b that communicates with the first nozzle hole 36 or communicates with the second inner outflow pipe 56 according to the placement of the second upper hole 88b.

The plurality of first chamber holes includes a first lower hole 88c that does not communicate with the first nozzle hole 36 even if the disposition is changed, and communicates with the first inner outflow pipe 52, and a second lower hole 88d that does not communicate with the second nozzle hole 42 even if the disposition is changed, and communicates with the second inner outflow pipe 56. The first upper hole 88a and the first lower hole 88c are disposed to face each other. The second upper hole 88b and the second lower hole 88d face each other. The first upper hole 88a and the second lower hole 88d are disposed parallel to the rotation shaft 96 of the valve 80. The second upper hole 88b and the first lower hole 88c are disposed parallel to the rotation shaft 96 of the valve 80.

When the first upper hole 88a is disposed in communication with the first nozzle hole 36, the water flowing through the first nozzle 34 flows into the first inner outflow pipe 52, and when the second upper hole 88b is disposed in communication with the first nozzle hole 36, water flowing through the second nozzle 40 flows into the second inner outflow pipe 56.

Figure 10A:
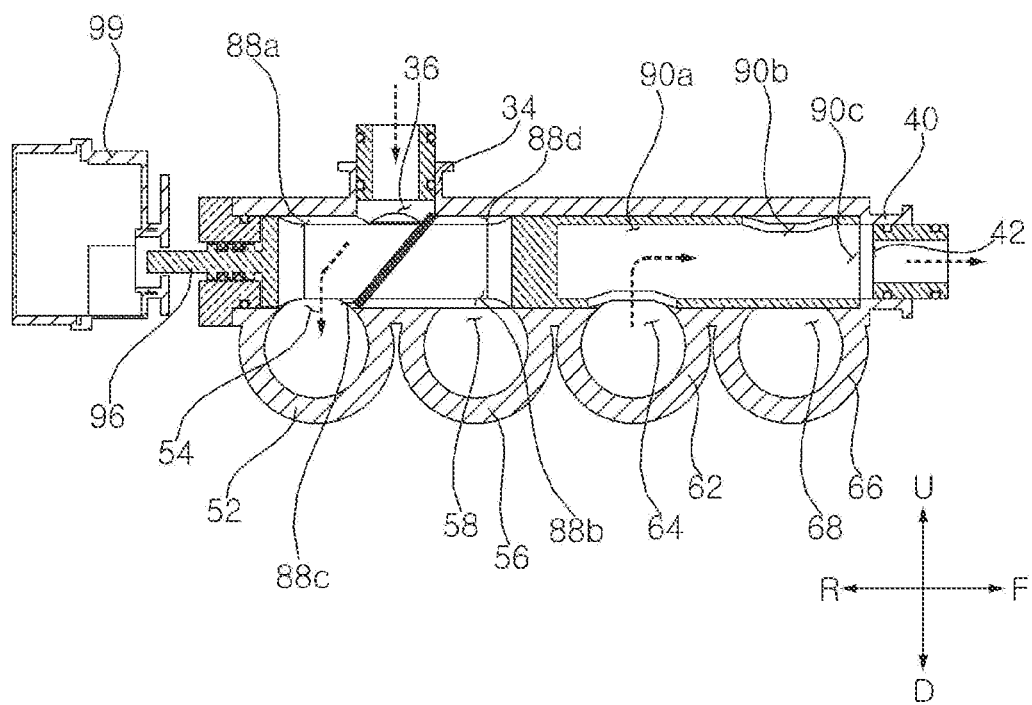
FIGS. 10A to 10C are diagrams for explaining the flow of water flowing through the flow path switching device according to the first embodiment of the present disclosure.
Figure 10B:
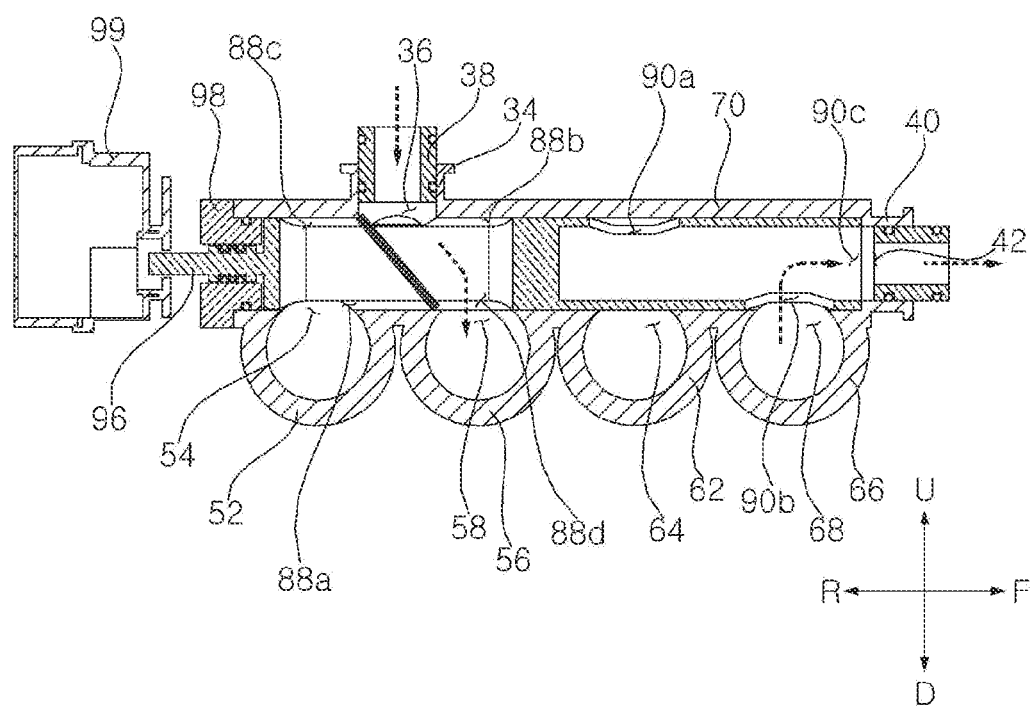

Referring to FIG. 10B, when the first upper hole 88a is disposed in communication with the first inner outflow pipe 52, water is not supplied to the first inner outflow pipe 52. Similarly, referring to FIG. 7A, when the second upper hole 88b is disposed in communication with the second inner outflow pipe 56, water is not supplied to the second inner outflow pipe 56.

The guide plate 94 may be disposed in the first chamber 84 to send water flowing from the first nozzle 34 to the first inner outflow pipe 52 or the second inner outflow pipe 56.

Referring to FIG. 10A or 10B, the guide plate 94 is disposed below the first nozzle 34. The guide plate 94 may have one end disposed in one end portion of the first nozzle adjacent to the first inner inflow pipe, or the other end disposed in the other end portion of the first nozzle adjacent to the second inner inflow pipe.

A first upper hole 88a and a second lower hole 88d may be formed in the opposite direction based on one end 94a of the guide plate 94. A second upper hole 88b and a first lower hole 88c may be formed in the opposite direction based on the other end 94b of the guide plate 94.

Referring to FIG. 5, the valve body 82 has a plurality of valve holes 90a and 90b connected to the first inner inflow pipe 62 or the second inner inflow pipe 66, and the nozzle connecting hole 90c connected to the second nozzle 40. The plurality of valve holes 90a and 90b include a first valve hole 90a communicating with the first inflow hole 64 according to the placement of the first valve hole 90a, and a second valve hole 90b communicating with the second inflow hole 68 according to the placement of the second valve hole 90b. The nozzle connection hole 90c is formed to communicate the second nozzle hole 42 and the second chamber.

The valve 80 further includes the rotation shaft 96 that extends from a distal end of the valve body 82 in a direction in which the motor 99 is disposed, and is connected to the motor 99 to rotate the valve body 82.

The motor 99 may be disposed in one side of the valve 80, be connected to the valve 80 by the rotation shaft 96, and rotate the valve 80.

Referring to FIG. 5, the flow path switching device 30 may further include a valve fixing member 98 for fixing the disposition of the rotating valve 80 inside the flow path connection portion 70 of the case 32. The valve fixing member 98 may prevent movement of the valve 80 rotating inside the flow path connection portion 70. The valve fixing member 98 may be disposed around the rotation shaft 96 of the valve 80. The valve fixing member 98 may be disposed between the rotation shaft 96 of the valve 80 and the case 32.

Figure 9:
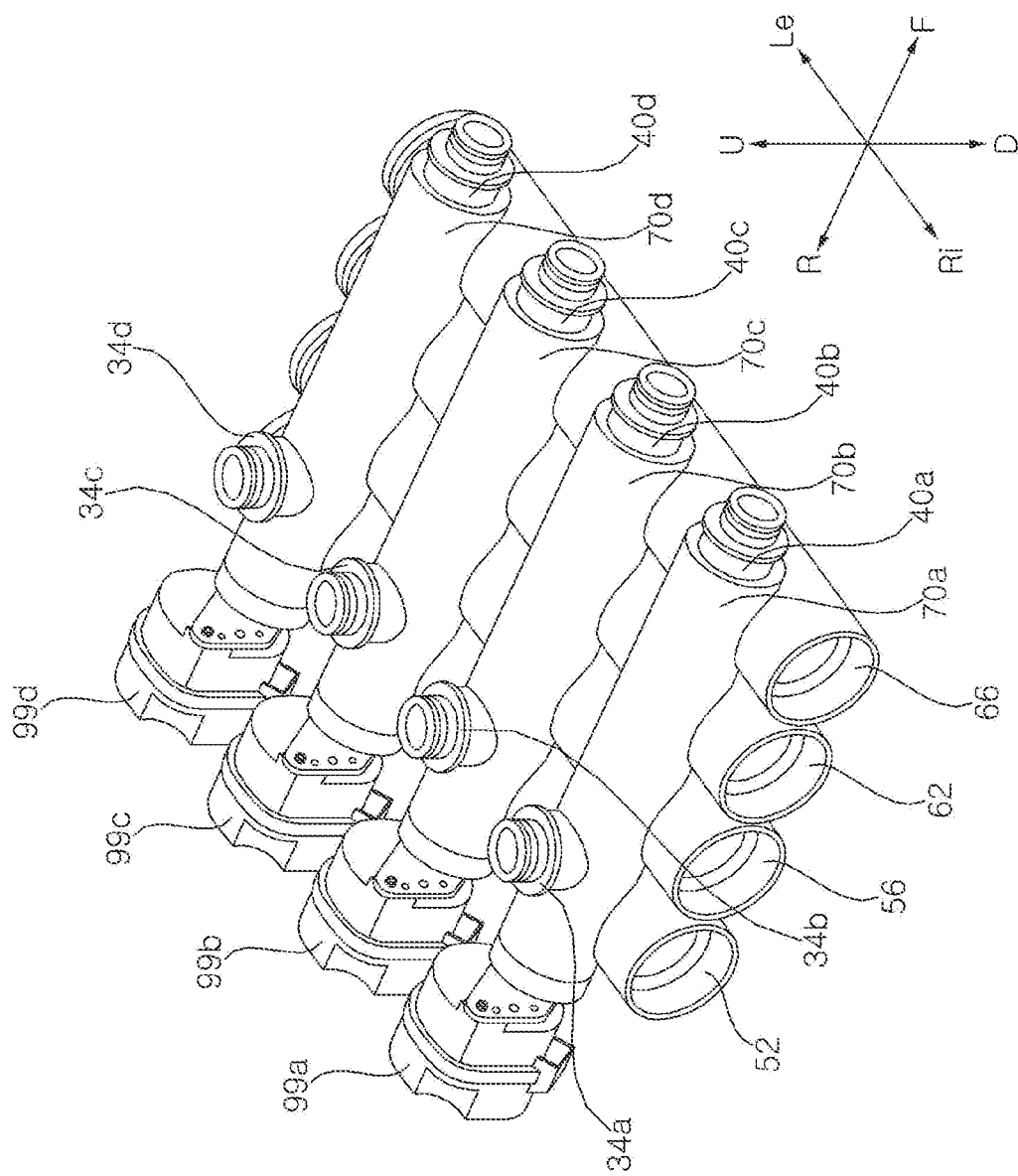
FIG. 9 is a perspective view of the flow path switching device according to the first embodiment in which a plurality of flow path connectors, a valve, and a motor are disposed.

Referring to FIG. 9, the case 32 includes a plurality of flow path connection portions 70a. 70b, 70c, and 70d. In each of the plurality of flow path connection portions 70a. 70b, 70c, and 70d, the first nozzle 34a, 34b, 34c, 34d through which water flowed from the indoor unit 100, 102, 104, 106 flows, and the second nozzle 40a, 40b, 40c, 40d through which water supplied to the indoor unit 100, 102, 104, 106 flows are disposed.

Referring to FIG. 9, the flow path switching device 30 includes a plurality of valves 80a, 80b, 80c, and 80 d disposed inside each of the plurality of flow path connection portions 70a, 70b, 70c, and 70d, and a plurality of motors 99a, 99b, 99c, 99d connected to each of the plurality of valves 80a, 80b, 80c, 80d.

Each of the plurality of flow path connection portions 70a. 70b, 70c, and 70d is connected to each of the plurality of indoor units 100, 102, 104, and 106.

Referring to FIG. 6, the plurality of flow path connection portions 70a, 70b, 70c, and 70d are spaced apart from each other in the direction in which the plurality of inner inflow pipes 62 and 66 and the plurality of inner outflow pipes 52 and 56 extend. The plurality of flow path connection portions 70a, 70b, 70c, and 70d are spaced apart from each other in a third direction (Ri-Le) perpendicular to the first direction (F-R).

Hereinafter, referring to FIGS. 11A to 16C, a flow path switching device according to a second embodiment will be described.

Figure 11A:
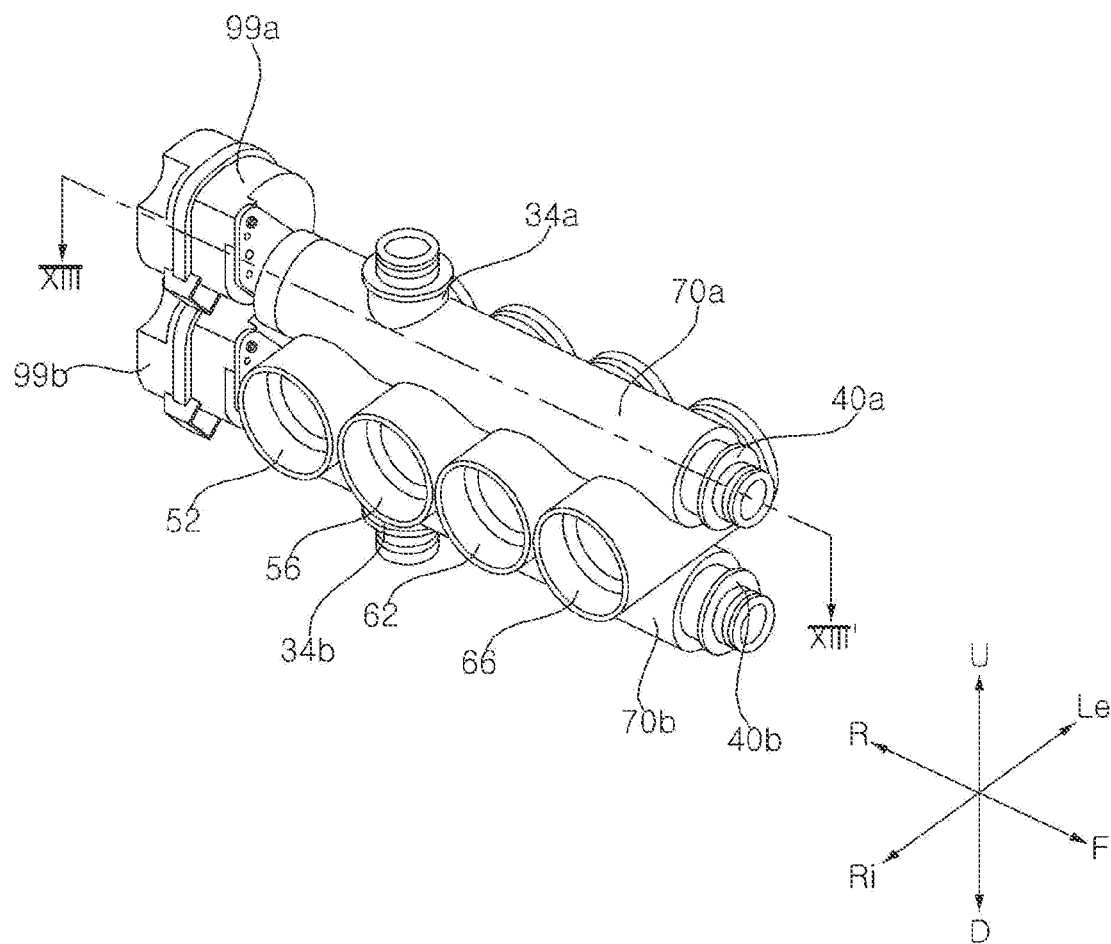
FIG. 11A is a perspective view of the flow path switching device according to the first embodiment of the present disclosure.
Figure 11B:
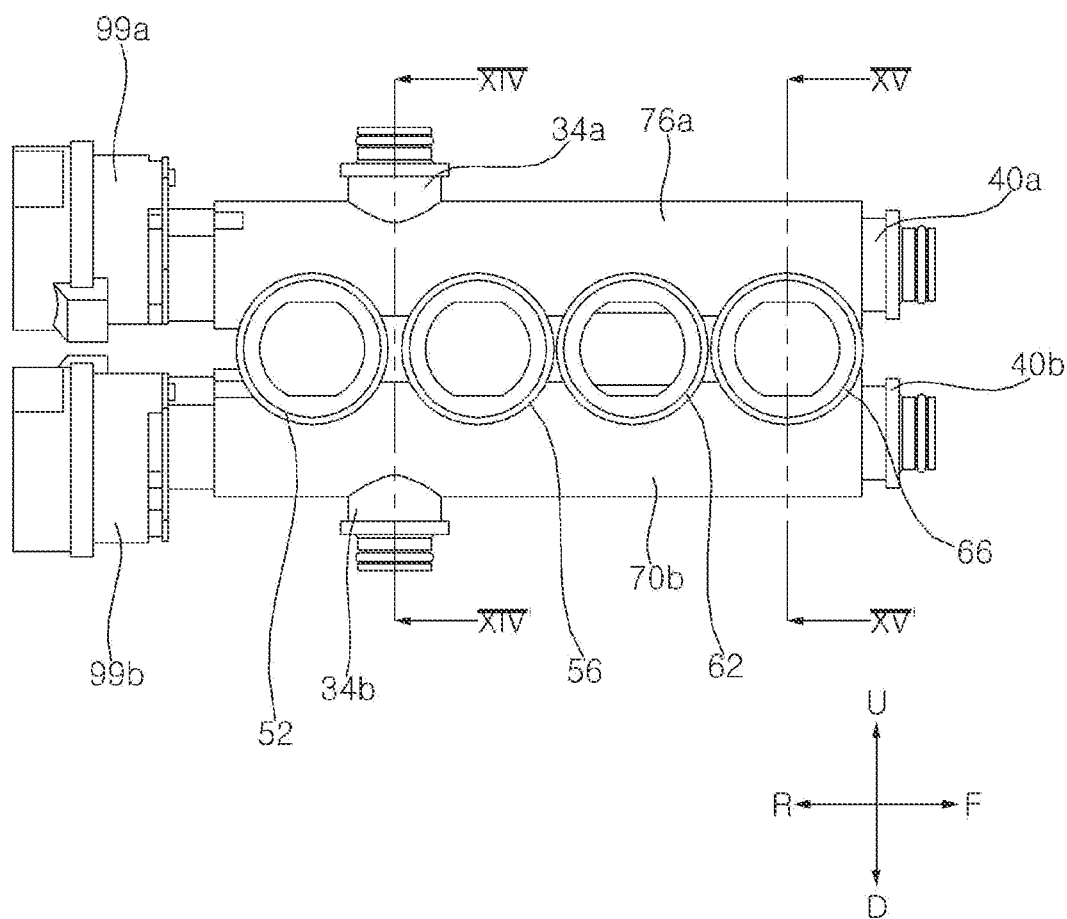
FIG. 11B is a side view of FIG. 11A.

Referring to FIGS. 11A and 11B, the plurality of flow path connection portions 70a, 70b, 70c, and 70d may be disposed in the vertical direction relative to the plurality of inner inflow pipes 62 and 66 and the plurality of inner outflow pipes 52 and 56. That is, the flow path connection portion 70 may be disposed in the vertical direction relative to the plurality of inner inflow pipes 62 and 66 and the plurality of inner outflow pipes 52 and 56, in the second direction (U-D) perpendicular to the first direction.

Referring to FIGS. 11A to 13, the case 32 includes: a first upper nozzle 34a into which fluid flows from one of the plurality of indoor units 100, 102, 104, 106; a second upper nozzle 40 a for sending fluid to one of the plurality of indoor units 100, 102, 104, 106; a first lower nozzle 34b into which fluid flows another indoor unit among the plurality of indoor units 100, 102, 104, 106; a second lower nozzle 40 b for sending fluid to another indoor unit among the plurality of indoor units; a plurality of inner outflow pipes 52 and 56 through which the fluid supplied from the first upper nozzle 34 a or the first lower nozzle 34b flows; a plurality of inner inflow pipes 62 and 66 for supplying fluid to the second upper nozzle 40 a or the second lower nozzle 40 b; a first flow path connection portion 70a having an upper space for communicating the plurality of inner outflow pipes 52 and 56 with the first upper nozzle or communicating the plurality of inner inflow pipes 62 and 66 with the second upper nozzle; and a second flow path connection portion 70a having a lower space for communicating the plurality of inner inflow pipes 52 and 56 with the first lower nozzle 34b or communicating the plurality of inner inflow pipes 62 and 66 with the second lower nozzle 40 b.

Figure 13:
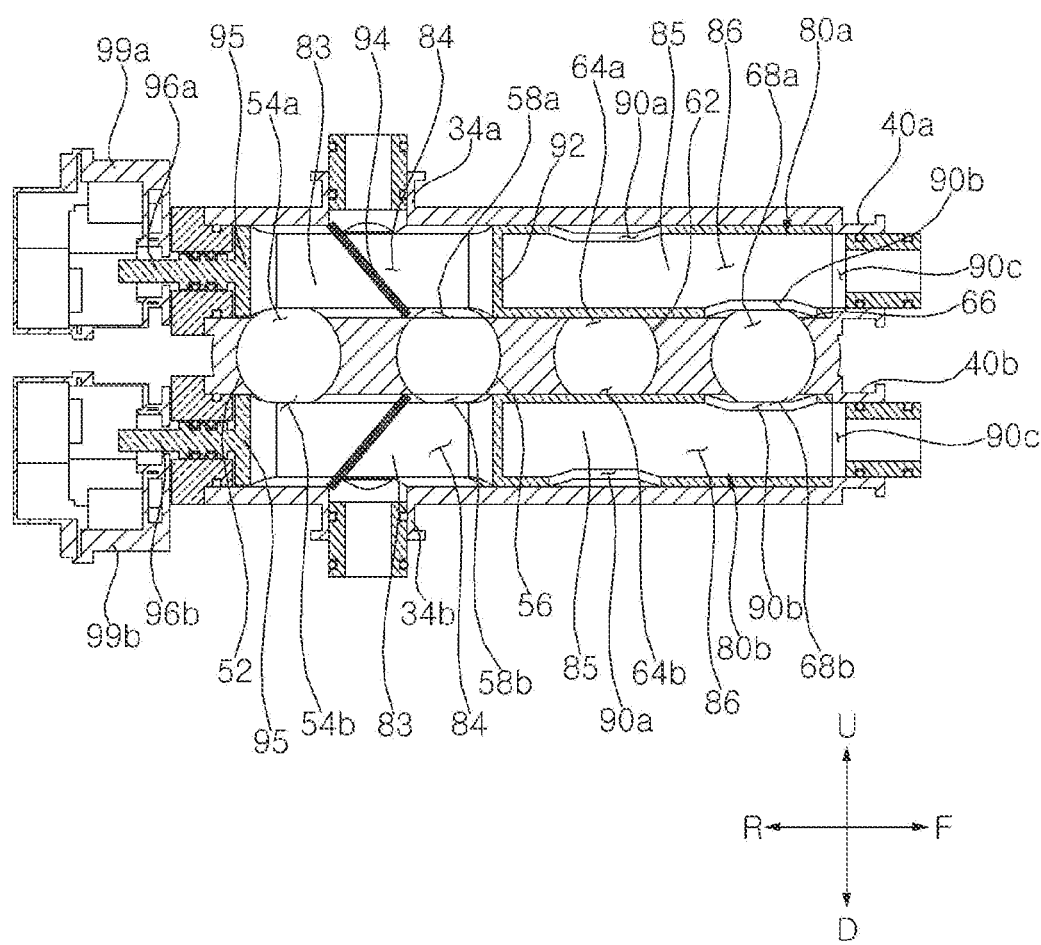
FIG. 13 is a cross-sectional view taken along line XIII-XIII' of FIG. 11A.

Referring to FIG. 13, the first flow path connection portion 70a and the second flow path connection portion 70b are disposed in the up-down direction based on the plurality of inner outflow pipes 52 and 56 and the plurality of inner inflow pipes 62 and 66.

The plurality of inner outflow pipes 52 and 56 and the plurality of inner inflow pipes 62 and 66 may be disposed between the first flow path connection portion 70a and the second flow path connection portion 70b, and may be spaced apart from each other in a direction in which a first rotation shaft around which the upper valve 80a rotates or a second rotation shaft around which the lower valve 80b rotates is formed. The first upper nozzle 34 a and the first lower nozzle 34b may have a shape protruding from the case 32 in different directions. The second upper nozzle 40 a and the second lower nozzle 40 b are disposed in the up-down direction based on the plurality of inner outflow pipes 52 and 56 and the plurality of inner inflow pipes 62 and 66, and protrude in the same direction.

The plurality of inner outflow pipes 52 and 56 include a first inner outflow pipe 52 connected to the first heat exchanger 22 and a second inner outflow pipe 56 connected to the second heat exchanger 24. The plurality of inner inflow pipes 62 and 66 include a first inner inflow pipe 62 connected to the first heat exchanger 22 and a second inner inflow pipe 66 connected to the second heat exchanger 24.

The upper space formed inside the first flow path connection portion 70a may be partitioned into a first upper space communicating the plurality of inner outflow pipes 52, 56 with the first upper nozzle, and a second upper space communicating the plurality of inner inflow pipes 62 and 66 with the second upper nozzle.

The lower space formed inside the second flow path connection portion 70b may be partitioned into a first lower space communicating the plurality of inner outflow pipes 52 and 56 and the first lower nozzle 34b, and a second lower space communicating the plurality of inner inflow pipes 62 and 66 with the second lower nozzle 40 b. Referring to FIG. 10, in each of the first inner outflow pipe 52 and the second inner outflow pipe 56, a first upper outflow hole 54a and a second upper outflow holes 58a that communicate with the first upper space of the first flow path connection portion 70a, and a first lower outflow hole 54 b and a second lower outflow hole 58 b that communicate with the first lower space of the second flow path connection portion 70b are formed.

Referring to FIG. 13, in each of the first inner inflow pipe 62 and the second inner inflow pipe 66, a first upper inflow hole 64 a and a second upper inflow hole 68 a that communicate with the second upper space of the first flow path connection portion 70a, and a first lower inflow hole 64b and a second lower inflow hole 68 b that communicate with the second lower space of the second flow path connection portion 70b are formed.

Figure 12:
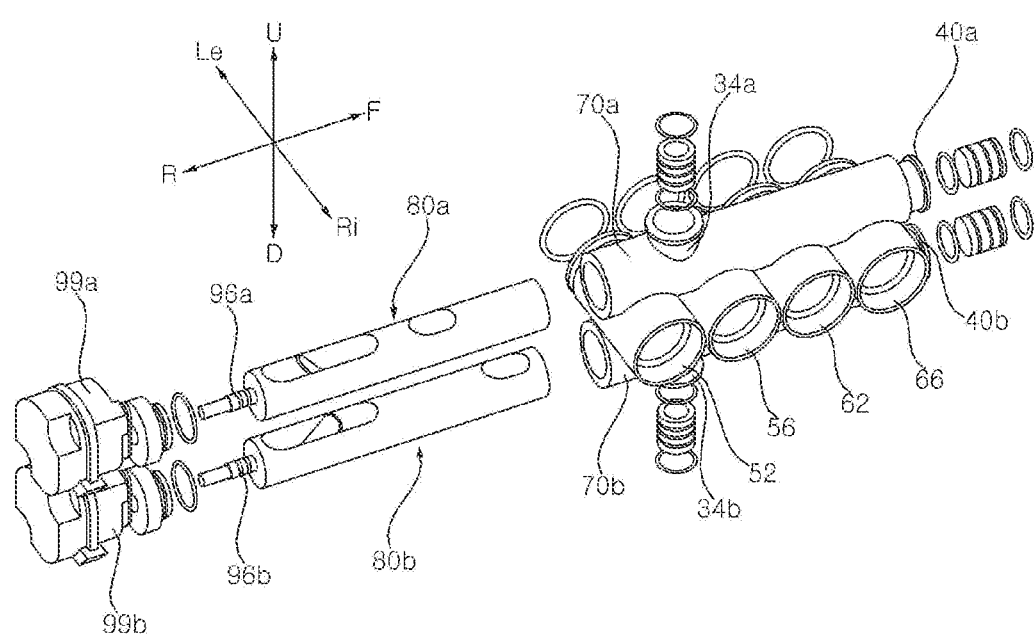
FIG. 12 is an exploded view of FIG. 11A.

Referring to FIG. 12, the flow path switching device 30 includes: an upper valve 80a that is rotatably disposed in the first upper space and the second upper space of the first flow path connection portion 70a, connects one of the plurality of inner outflow pipes 52 and 56 to the first upper nozzle according to the placement of the upper valve 80a, and connects one of the plurality of inner inflow pipes 62 and 66 and the second upper nozzle 40a; and a lower valve 80b that is rotatably disposed in the first lower space and the second lower space of the second flow path connection portion 70b, connects one of the plurality of inner outflow pipes 52 and 56 to the first lower nozzle 34b according to the placement of the lower valve 80b, and connects one of the plurality of inner inflow pipes 62 and 66 and the second lower nozzle 40.

Referring to FIGS. 12 to 13, the flow path switching device 30 includes a first motor 99a that is disposed in one side of the upper valve 80a and rotates the upper valve 80a, and a second motor 99b that is disposed in one side of the lower valve 80b and rotates the second valve 80 b.

Referring to FIG. 13, the case 32 may include a plurality of first flow path connection portions 70a and a plurality of second flow path connection portions 70b. The plurality of first flow path connection portions 70a may be spaced apart from each other in a direction in which the plurality of inner inflow pipes 62, 66 and the plurality of inner outflow pipes 52, 56 are extended, in the upper side of the plurality of inner outflow pipes 52, 56 and the plurality of inner inflow pipes 62, 66. Similarly, the plurality of second flow path connection portions 70b may be spaced apart from each other in a direction in which the plurality of inner inflow pipes 62, 66 and the plurality of inner outflow pipes 52, 56 are extended, in the lower side of the plurality of inner outflow pipes 52, 56 and the plurality of inner inflow pipes 62, 66.

Each of the upper valve 80a and the lower valve 80b has the same composition and shape as the valve 80 according to the first embodiment described in FIGS. 3 to 5, 6A, and 7A.

Each of the upper valve 80a and the lower valve 80b may include a first valve body 83 forming the first chamber 84, a second valve body 85 forming the second chamber 86, and the partition plate 92 disposed between the first valve body 83 and the second valve body 85.

Figure 14:
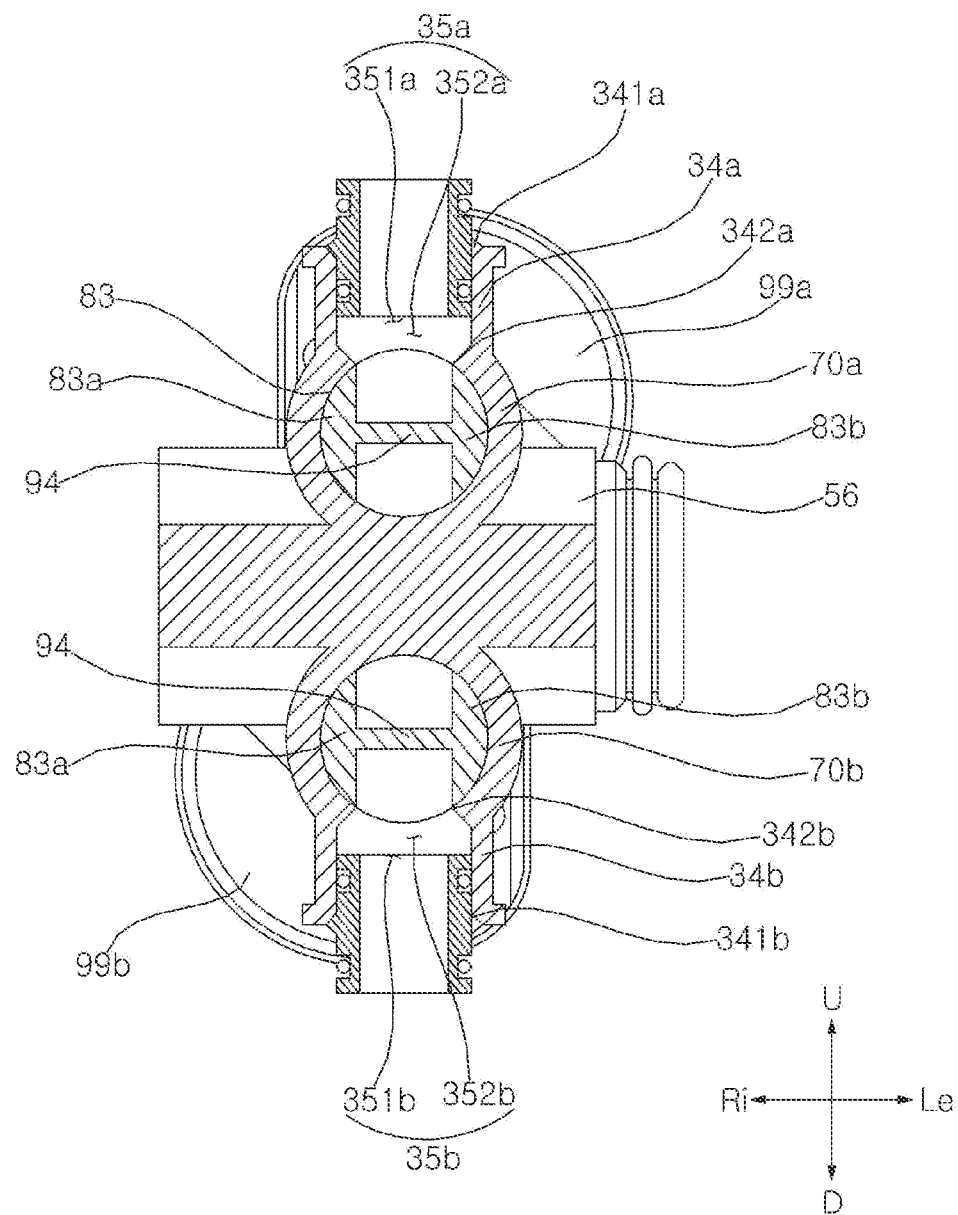
FIG. 14 is a cross-sectional view taken along line XIV-XIV' of FIG. 11B.

Referring to FIGS. 13 and 14, the end plate 95 connected to the rotation shaft % is disposed at one end of the first valve body 83, and the partition plate 92 is disposed at the other end. The first valve body 83 is disposed between the end plate 95 and the partition plate 92, and the pair of outer walls 83a and 83b connecting the end plate 95 and the partition plate 92 are disposed. Between the pair of outer walls 83a and 83b, a guide plate 84 is disposed.

Figure 15:
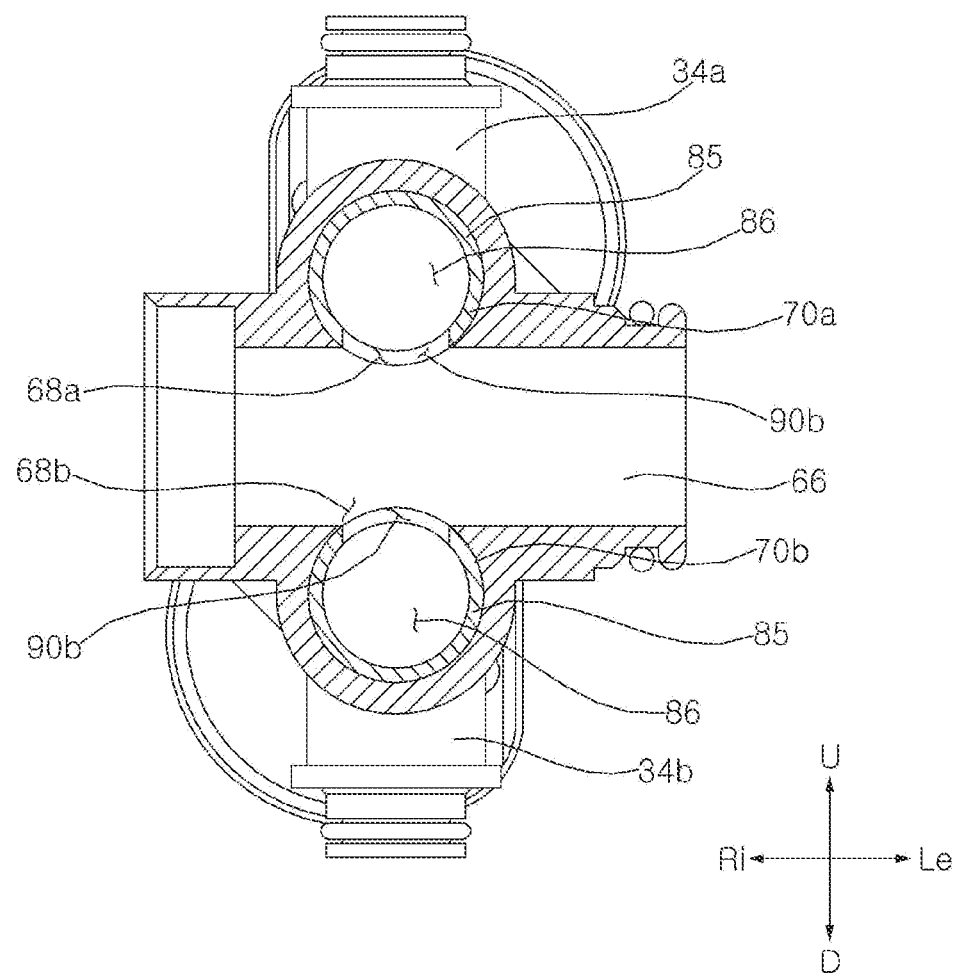
FIG. 15 is a cross-sectional view taken along line XV-XV' of FIG. 11B.

Referring to FIGS. 13 and 15, the second valve body 85 is hollow inside and has a substantially cylindrical shape. The partition plate 92 is disposed at one end of the second valve body 85, and a nozzle connection hole 90c is formed at the other end. In the second valve body 85, a first valve hole 90a and a second valve hole 90b are formed. The first valve hole 90a and the second valve hole 90b are disposed with a phase difference of 180 degrees from each other at positions corresponding to the first inner inflow pipe 62 and the second inner inflow pipe 66.

Referring to FIG. 14, an upper nozzle flow path 35a and a lower nozzle flow path 35b through which water flows are formed in the first upper nozzle 34a and the first lower nozzle 34b, respectively.

Each of the upper nozzle flow path 35a and the lower nozzle flow path 35b is formed to narrow down the cross-sectional area at a portion connected to the first flow path connection portion 70a or the second flow path connection portion 70b.

The upper nozzle flow path 35a may include a first upper nozzle flow path 351a extending from the inlet 341a of the first upper nozzle 34a while maintaining a cross-sectional area, and a second upper nozzle flow path 352 connected to the first upper nozzle flow path 351a with a reduced cross-sectional area.

The lower nozzle flow path 35b may include a first lower nozzle flow path 351b extending from the inlet 341b of the first lower nozzle 34b while maintaining a cross-sectional area, and a second lower nozzle flow path 352b connected to the first lower nozzle flow path 351b with a reduced cross-sectional area.

An area of a chamber hole disposed in a region where the first upper nozzle 34a is located is smaller than a cross-sectional area of the first upper nozzle flow path 351a and larger than a cross-sectional area of an outlet portion 342a of the second upper nozzle flow path 352a. Similarly, an area of a chamber hole disposed in a region where the first lower nozzle 34b is located is smaller than the cross-sectional area of the first lower nozzle flow path 351b and greater than or equal to a cross-sectional area of an outlet portion 342b of the second lower nozzle flow path 352b.

Figure 16:
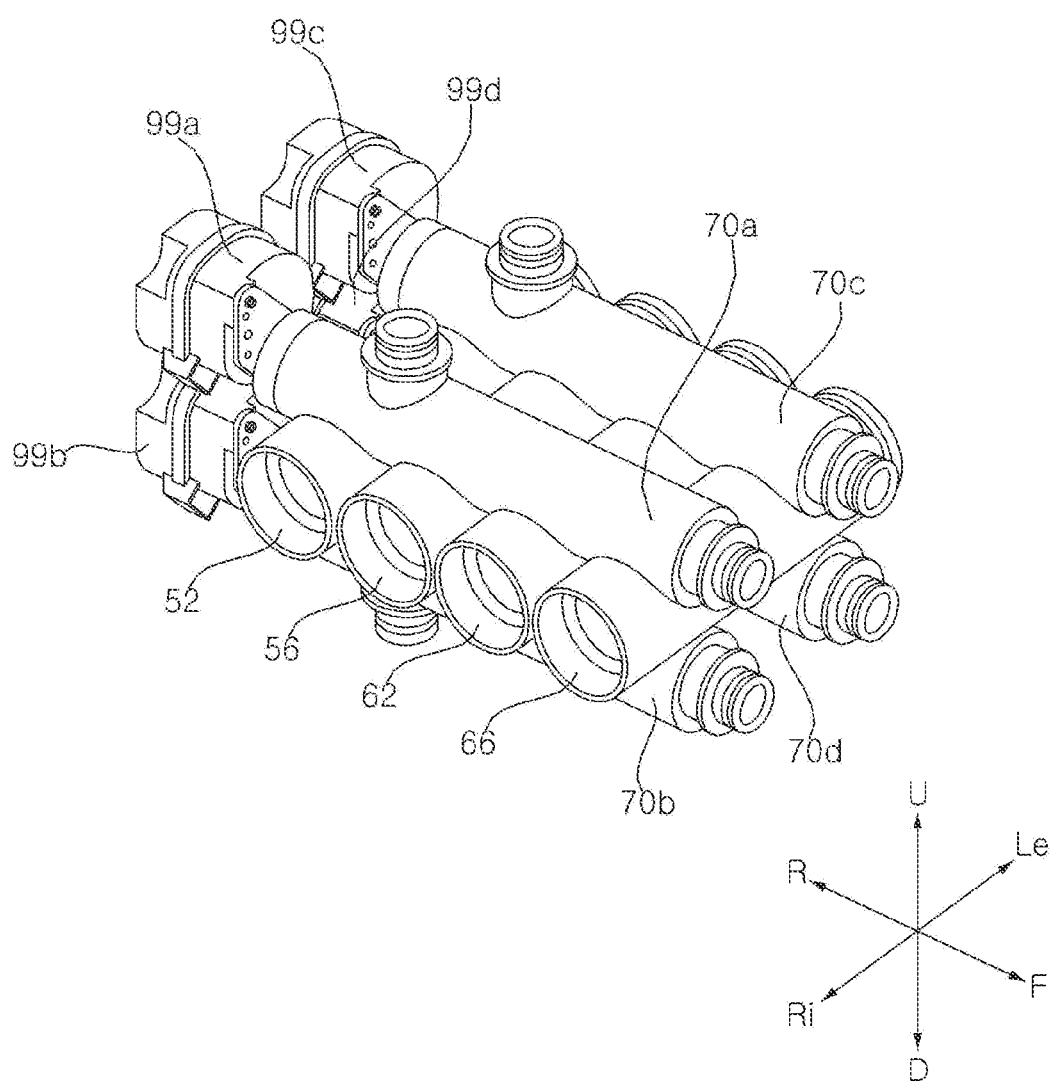
FIG. 16 is a perspective view of a flow path switching device, which is the flow path switching device according to the second embodiment including an additional flow path connector, a valve, and a motor.

Referring to FIG. 15, each of the first valve hole 90a and the second valve hole 90b formed in the upper valve 80a is of a size corresponding to that of the second inflow hole 68 formed in the second inner inflow pipe 66. Each of the first valve hole 90a and the second valve hole 90b formed in the lower valve 80b is of a size corresponding to the second inflow hole 68 formed in the second inner inflow pipe 66. Referring to FIG. 16, the case 32 may include a plurality of flow path connection portions 70a, 70b, 70c, and 70d. The plurality of flow path connection portions 70a, 70b, 70c, and 70d is disposed in the vertical direction relative to the plurality of inner outflow pipes 52 and 56 and the plurality of inner inflow pipes 62 and 66, and may be spaced apart from each other in a direction in which the plurality of inner outflow pipes 52 and 56 and the plurality of inner inflow pipes 62 and 66 extend.

In the flow path switching device of the present disclosure, the plurality of flow path connectors 70a, 70b, 70c, and 70d may be arranged as shown in FIG. 9 or as shown in FIG. 15. The flow path switching device may be variously changed in shape according to a space inside the relay device, thereby offering high space efficiency and applicability even in a small space.

<Operation>

Hereinafter, with reference to FIGS. 10A to 10C, the flow of fluid according to the operation of the flow path switching device 30 will be described.

A plurality of valves is disposed in the case 32, and each of the plurality of valves is respectively connected a plurality of indoor units. The plurality of indoor units may be operated for either cooling or heating based on a condition of an indoor space or user preferences. Thus, the plurality of valves may be operated in different directions.

Referring to FIG. 10A, the valve 80 may connect the first nozzle 34 and the first inner outflow pipe 52 and connect the second nozzle 40 and the first inner inflow pipe 62, thereby connecting one indoor unit and the first heat exchanger 22. In this case, when the first heat exchanger 22 supplies heated water through a refrigerant, the heated water may be supplied to the indoor units 100, 102, 104, and 106.

Referring to FIG. 10B, the valve 80 may connect the first nozzle 34 and the second inner inflow pipe 56 and connect the second nozzle 40 and the second inner inflow pipe 66, thereby connecting one indoor unit and the second heat exchanger 24. In this case, when the second heat exchanger 24 supplies cooled water through a refrigerant, the cooled water may be supplied to the indoor units 100, 102, 104, and 106.

Figure 10C:
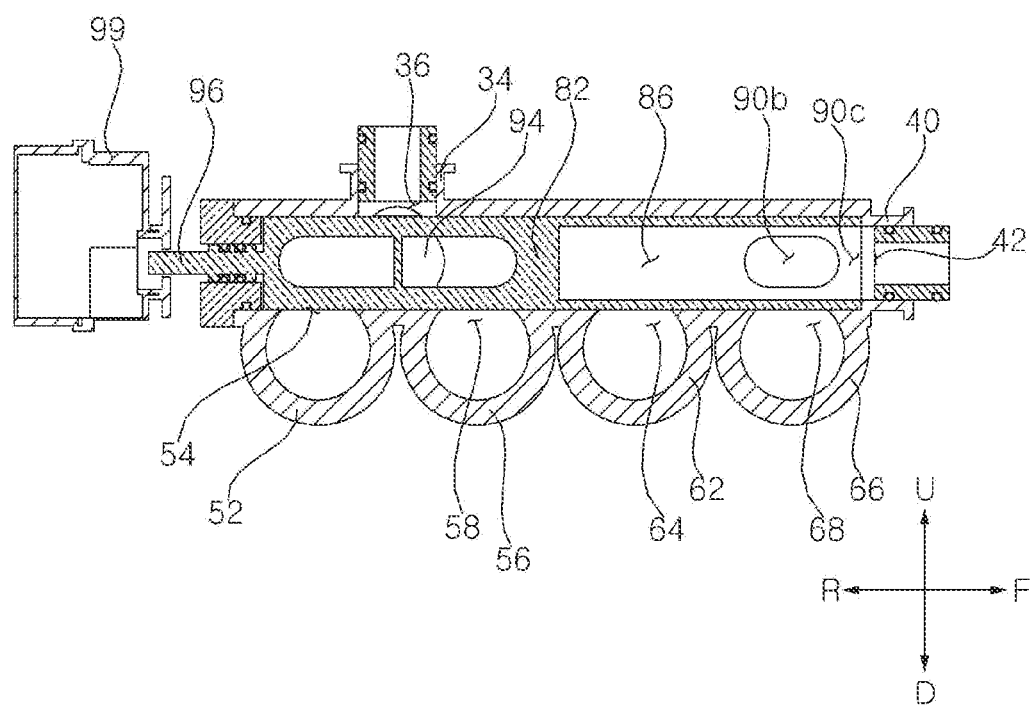

Referring to FIG. 10C, the valve 80 may close the first nozzle 34 and the second nozzle 40. When the corresponding indoor unit is not separately operated, the inside of a flow path connection portion is closed through the valve 80 to prevent heat-exchanged water from flowing into the indoor unit that does not require heat exchange.

The arrangement of valves in FIGS. 10A to 10C may be identically applied to the flow path switching device of FIG. 8. In FIGS. 12A to 12C, the arrangement of the upper valve 80a disposed above the plurality of inner outflow pipes 52 and 56 and the plurality of inner inflow pipes 62 and 66 is changed. However, this is according to the embodiment, the second valve 80a disposed below the plurality of inner outflow pipes 52 and 56 and the plurality of inner inflow pipes 62 and 66 may also operate individually.

Figure 17A:
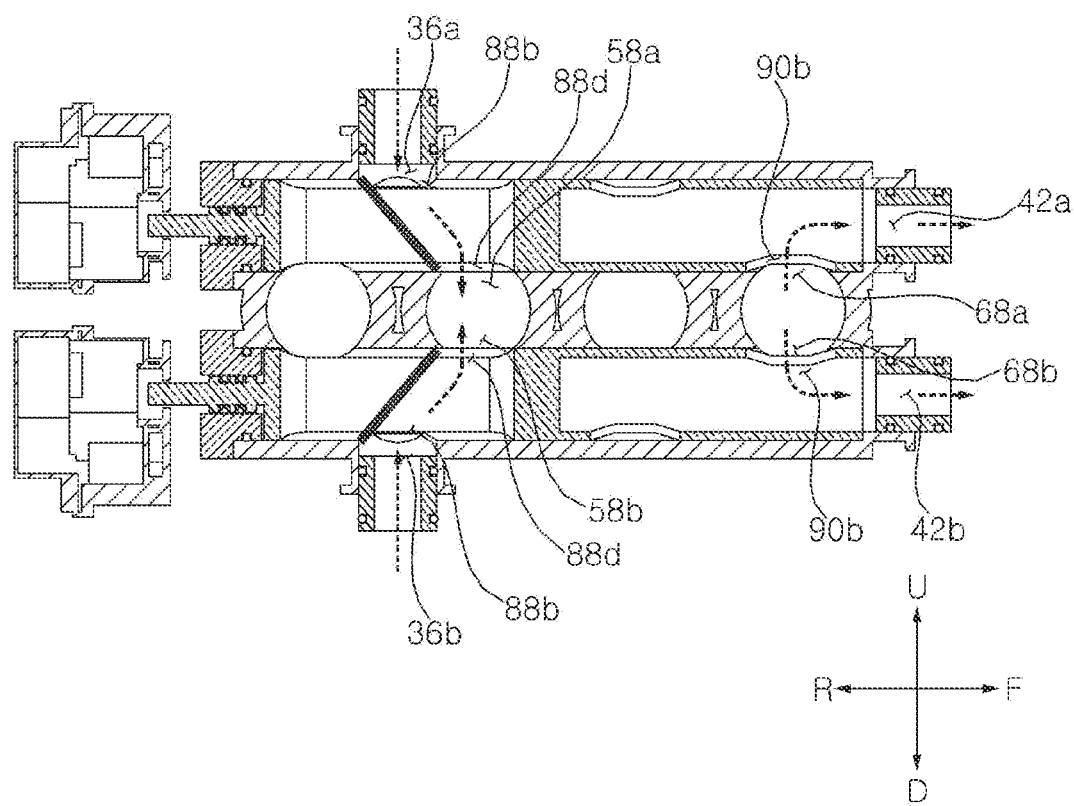
Figure 17B:
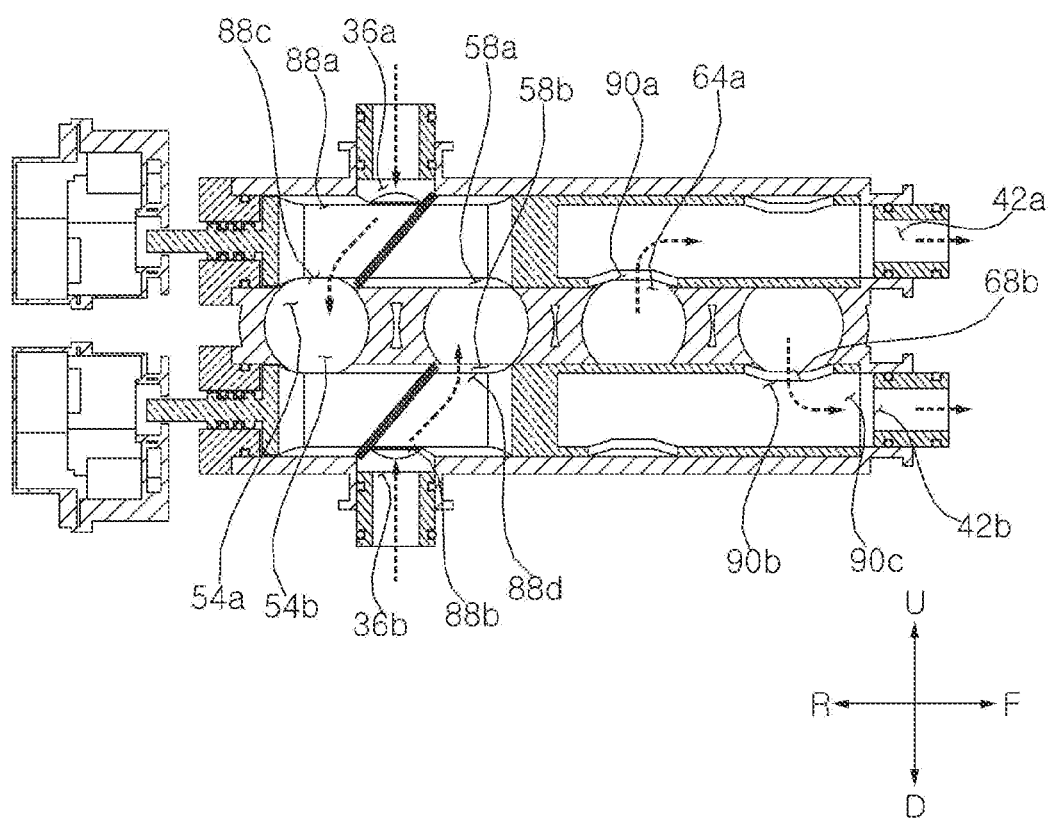
Figure 17C:
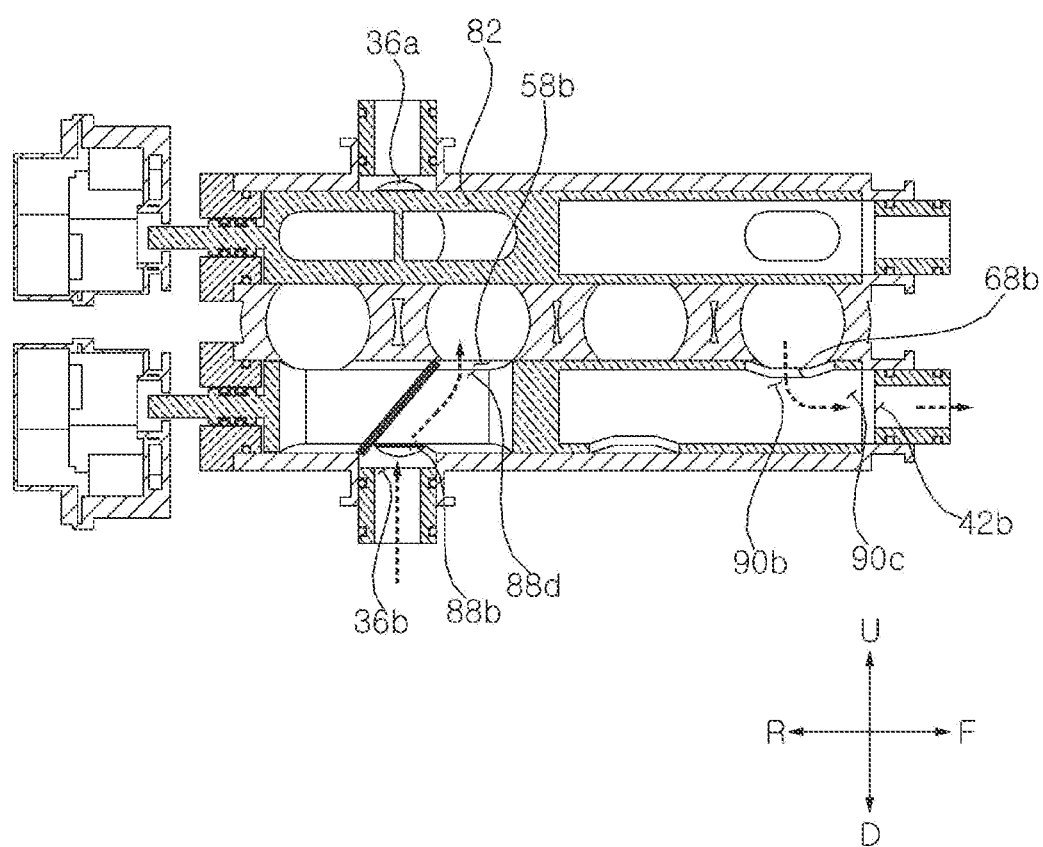

Referring to FIG. 17A, the upper valve 80a connects the first upper nozzle 34a and the first inner inflow pipe 52, and connects the second upper nozzle 40a and the first inner inflow pipe 62, thereby connecting one indoor unit and the first heat exchanger 22. 17B, the upper valve 80a connects the first upper nozzle 34a and the second inner inflow pipe 56, and connects the second upper nozzle 40a and the second inner inflow pipe 66, thereby connecting one indoor unit and the second heat exchanger 24. In addition, referring to FIG. 17C, the upper valve 80a may close the first upper nozzle 34a and the second upper nozzle 40a.

Although the present disclosure has been described and illustrated with exemplary embodiments, the present disclosure is not limited thereto, but may be variously modified and altered by those skilled in the art to which the present disclosure pertains without departing from the subject matters of the present disclosure claimed in the following claims, and these modifications or alterations should not be appreciated individually from the technical spirit or prospect of the present disclosure.

What is claimed is:

1. A flow path switching device comprising:
   a case, comprising:
      a first nozzle configured to receive fluid, the first nozzle defining a nozzle flow path therein,
      a second nozzle configured to discharge the fluid,
      a plurality of outflow pipes configured to carry the fluid received from the first nozzle, each of the plurality of outflow pipes defining an outflow path that is orthogonal to the nozzle flow path,
      a plurality of inflow pipes configured to supply the fluid to the second nozzle, and
      a flow path connection portion that defines a space configured to communicate the plurality of outflow pipes with the first nozzle or to communicate the plurality of inflow pipes with the second nozzle, the flow path connection portion being orthogonal to the nozzle flow path and the outflow path;
   a valve rotatably disposed in the space of the flow path connection portion, the valve having (i) a first chamber configured to connect one of the plurality of outflow pipes to the first nozzle based on rotation of the valve relative to the case, and (ii) a second chamber configured to connect one of the plurality of inflow pipes to the second nozzle based on rotation of the valve relative to the case; and
   a motor disposed at one side of the valve and configured to rotate the valve relative to the case,
   wherein the valve defines a first chamber hole configured to connect the first chamber to the nozzle flow path,
   wherein the nozzle flow path has (i) a first cross-sectional area at an inlet portion of the first nozzle and (ii) a second cross-sectional area at a portion connected to the first chamber hole, the second cross-sectional area being smaller than the first cross-sectional area and corresponding to a size of the first chamber hole,
wherein the valve comprises a rotation shaft that defines a rotational axis of the valve,
wherein the plurality of outflow pipes and the plurality of inflow pipes are spaced apart from one another in a direction of the rotation shaft, and
wherein the plurality of outflow pipes and the plurality of inflow pipes are disposed at one side of the flow path connection portion and extend parallel to one another.

2. The flow path switching device of claim 1, wherein the nozzle flow path comprises:
a first nozzle flow path that extends from the inlet portion of the first nozzle and has the first cross-sectional area; and
a second nozzle flow path that is connected to the first nozzle flow path and defines a cross-sectional area smaller than the first cross-sectional area.

3. The flow path switching device of claim 2, wherein the second cross-sectional area of the nozzle flow path at the first chamber hole is greater than or equal to the cross-sectional area of an outlet portion of the second nozzle flow path.

4. The flow path switching device of claim 1, wherein the valve comprises:
a first valve body that defines the first chamber, the first valve body comprising a pair of outer walls that are spaced apart from each other;
a second valve body that defines the second chamber; and
a partition plate disposed between the first valve body and the second valve body, and
wherein the first valve body defines a plurality of chamber holes that are open to a vertical direction relative to the first chamber.

5. The flow path switching device of claim 4, wherein the pair of outer walls define:
a pair of inner surfaces that face each other and extend parallel to each other, and
a pair of outer surfaces that are convex and opposite to the pair of inner surfaces, respectively.

6. The flow path switching device of claim 4, wherein the rotation shaft of the valve is disposed at one side of the first valve body and connected to the motor,
wherein a width of the nozzle flow path is defined between inner sides of the nozzle flow path that are spaced apart from each other in a direction orthogonal to the rotation shaft,
wherein the width of the nozzle flow path decreases from the inlet portion of the first nozzle toward the flow path connection portion, and
wherein the width of the nozzle flow path at an outlet portion of the nozzle flow path is smaller than or equal to a distance between the pair of outer walls.

7. The flow path switching device of claim 4, wherein the valve further comprises a guide plate that is disposed between the pair of outer walls and defines an inclined surface, the guide plate being configured to guide the fluid from the first nozzle toward a first outflow pipe or a second outflow pipe among the plurality of outflow pipes.

8. The flow path switching device of claim 7, wherein the guide plate is disposed below the first nozzle and configured to direct the fluid from the first nozzle to the first outflow pipe or the second outflow pipe based on rotation of the valve relative to the case.

9. The flow path switching device of claim 1, wherein each of the plurality of inflow pipes defines a plurality of inflow holes configured to fluidly communicate with the second chamber,
wherein the valve defines a plurality of valve holes that are configured to communicate an inside of the second chamber with each of the plurality of inflow pipes, and
wherein a size of each of the plurality of inflow holes is smaller than or equal to a size of one of the plurality of valve holes.

10. The flow path switching device of claim 9,
wherein the plurality of inflow pipes comprise:
a first inflow pipe that defines a first inflow hole among the plurality of inflow holes; and
a second inflow pipe that is spaced apart from the first inflow pipe in a direction of the rotation shaft and defines a second inflow hole among the plurality of inflow holes,
wherein the plurality of valve holes comprise:
a first valve hole configured to communicate with the first inflow hole based on rotation of the valve relative to the case, and
a second valve hole configured to communicate with the second inflow hole based on rotation of the valve relative to the case, and
wherein a size of each of the first inflow hole and the second inflow hole is smaller than or equal to a size of the first valve hole or the second valve hole.

11. The flow path switching device of claim 10, wherein the valve further comprises:
a first valve body that defines the first chamber;
a second valve body that defines the second chamber, the second valve body having a hollow cylindrical shape; and
a partition plate disposed between the first valve body and the second valve body, and
wherein the first valve hole and the second valve hole are defined at a circumferential surface of the second valve body and arranged with a phase difference of 180 degrees from each other.

12. The flow path switching device of claim 11, wherein the second nozzle extends from a distal end of the flow path connection portion in a direction parallel to the rotation shaft of the valve,
wherein the partition plate is disposed at a first end of the second valve body, and
wherein the second valve body defines a nozzle connection hole at a second end of the second valve body opposite to the first end, the nozzle connection hole communicating the inside of the second chamber with the second nozzle.

13. The flow path switching device of claim 1, wherein the valve further comprises:
a first valve body that defines the first chamber;
a second valve body that defines the second chamber, the second valve body having a hollow cylindrical shape; and
a partition plate disposed between the first valve body and the second valve body,
wherein the rotation shaft of the valve is disposed at one side of the first valve body and connected to the motor,
wherein the first valve body comprises a pair of outer walls spaced apart from each other, the pair of outer walls defining (i) a pair of inner surfaces that face each other and extend parallel to each other and (ii) a pair of outer surfaces that are convex and opposite to the pair of inner surfaces, respectively, and wherein the second valve body defines a plurality of valve holes at a circumferential surface of the second valve body, the plurality of valve holes being configured to fluidly communicate an inside of the second chamber with the plurality of inflow pipes.

14. The flow path switching device of claim 13, wherein the first valve body comprises a guide plate that is inclined with respect to the rotation shaft and disposed between the pair of outer walls,
wherein the first nozzle extends perpendicular to an axis of the rotation shaft and is disposed adjacent to the guide plate, and
wherein the second nozzle extends parallel to the axis of the rotation shaft.

15. The flow path switching device of claim 1, wherein the flow path connection portion extends in a first direction,
wherein the plurality of outflow pipes and the plurality of inflow pipes extend in a second direction orthogonal to the first direction, and
wherein the nozzle flow path extends in a third direction orthogonal to the first direction and the second direction.

16. The flow path switching device of claim 15, wherein the valve is configured to rotate about an axis parallel to the first direction.

17. An air conditioner comprising:
an outdoor unit;
a plurality of indoor units; and
a plurality of flow path switching devices configured to connect the outdoor unit to the plurality of indoor units, respectively,
wherein each of the plurality of flow path switching devices comprises:
a case, comprising:
a first nozzle configured to receive fluid, the first nozzle defining a nozzle flow path therein,
a second nozzle configured to discharge the fluid,
a plurality of outflow pipes configured to carry the fluid received from the first nozzle, each of the plurality of outflow pipes defining an outflow path that is orthogonal to the nozzle flow path,
a plurality of inflow pipes configured to supply the fluid to the second nozzle, and
a flow path connection portion that defines a space configured to communicate the plurality of outflow pipes with the first nozzle or to communicate the plurality of inflow pipes with the second nozzle, the flow path connection portion being orthogonal to the nozzle flow path and the outflow path,
a valve rotatably disposed in the space of the flow path connection portion, the valve having (i) a first chamber configured to connect one of the plurality of outflow pipes to the first nozzle based on rotation of the valve relative to the case, and (ii) a second chamber configured to connect one of the plurality of inflow pipes to the second nozzle based on rotation of the valve relative to the case, and
a motor disposed at one side of the valve and configured to rotate the valve relative to the case,
wherein the valve defines a first chamber hole configured to connect the first chamber to the nozzle flow path,
wherein the nozzle flow path has (i) a first cross-sectional area at an inlet portion of the first nozzle and (ii) a second cross-sectional area at a portion connected to the first chamber hole, the second cross-sectional area being smaller than the first cross-sectional area and corresponding to a size of the first chamber hole,
wherein the valve comprises a rotation shaft that defines a rotational axis of the valve,
wherein the plurality of outflow pipes and the plurality of inflow pipes are spaced apart from one another in a direction of the rotation shaft, and
wherein the plurality of outflow pipes and the plurality of inflow pipes are disposed at one side of the flow path connection portion and extend parallel to one another.

18. The air conditioner of claim 17, wherein each of the first nozzle and the second nozzle is connected to one of the plurality of indoor units.

19. The air conditioner of claim 17, wherein each of the plurality of flow path switching devices is connected to one of the plurality of indoor units,
wherein the flow path connection portion extends in a first direction,
wherein the plurality of outflow pipes and the plurality of inflow pipes extend in a second direction orthogonal to the first direction, and
wherein the plurality of flow path switching devices extend parallel to one another and are spaced apart from each other in the second direction.

* * * * *